US012801810B2

(12) United States Patent
Chandrasekhar et al.

(10) Patent No.: US 12,801,810 B2
(45) Date of Patent: Nov. 17, 2026

(54) INVERSE DESIGN OF PHOTONIC DEVICE FOOTPRINTS AND WAVEGUIDE LOCATIONS

(71) Applicant: X Development LLC, Mountain View, CA (US)

(72) Inventors: Aaditya Chandrasekhar, Madison, WI (US); Ian Williamson, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 969 days.

(21) Appl. No.: 18/159,006

(22) Filed: Jan. 24, 2023

(65) Prior Publication Data

US 2024/0256732 A1 Aug. 1, 2024

(51) Int. Cl.
*G06F 30/00* (2020.01)
*G06F 30/20* (2020.01)
*G06F 119/18* (2020.01)

(52) U.S. Cl.
CPC .......... *G06F 30/20* (2020.01); *G06F 2119/18* (2020.01)

(58) Field of Classification Search
CPC ............................. G06F 30/20; G06F 2119/18
USPC ............................................................... 703/2
See application file for complete search history.

(56) References Cited

U.S. PATENT DOCUMENTS

2015/0302124 A1 10/2015 Lee et al.
2018/0189425 A1 7/2018 Van Vaerenbergh et al.
2019/0018919 A1 1/2019 Huang et al.
2022/0077948 A1* 3/2022 Lu .......................... G06N 3/084
2023/0088537 A1* 3/2023 Harris ..................... G06F 30/17 700/98

FOREIGN PATENT DOCUMENTS

WO 2017-049276 A2 3/2017

OTHER PUBLICATIONS

Miller, D.O., "Photonic Design: From Fundamental Solar Cell Physics to Computational Inverse Design," doctoral dissertation, University of California, Berkeley, California, 2012, 136 pages.

(Continued)

*Primary Examiner* — Tiffany P Young

(74) *Attorney, Agent, or Firm* — Christensen O'Connor Johnson Kindness PLLC

(57) ABSTRACT

In some embodiments, a computer-implemented method for designing a physical device is provided. A computing system generates an initial design that includes an input waveguide starting at an input location and extending to a end position, an output waveguide starting at a start position and extending to an output location, and a dispersive region. The computing system determines a set of structural parameters based on the initial design. The computing system simulates performance of the initial design using the set of structural parameters to determine a performance loss value based on at least one performance goal. The computing system updates at least one of the end position of the input waveguide, the start position of the output waveguide, or a size of the dispersive region in the initial design using a gradient of the performance loss value.

18 Claims, 17 Drawing Sheets

(56) References Cited

OTHER PUBLICATIONS

Panetta, J., et al., "Computational Inverse Design of Surface-based Inflatables," ACM Trans. Graph., vol. 40, No. 4, Article 40, Aug. 2021, pp. 40:01-40:13.
Wein, F., et al., "A review on feature-mapping methods for structural optimization," arXiv:1910.10770v1 [math.OC], Oct. 23, 2019, 41 pages.
Michaels, A., et al., "Leveraging continuous material averaging for inverse electromagnetic design," Optics Express, vol. 26, No. 24, Nov. 16, 2018, 21 pages.
PCT International Search Report and Written Opinion mailed May 27, 2024, in corresponding International Application No. PCT/US2024/012396, 11 pages.

* cited by examiner

INVERSE DESIGN OF PHOTONIC DEVICE FOOTPRINTS AND WAVEGUIDE LOCATIONS

TECHNICAL FIELD

This disclosure relates generally to inverse design of physical devices, and in particular but not exclusively, relates to inverse design of photonic devices.

BACKGROUND

Fiber-optic communication is typically employed to transmit information from one place to another via light that has been modulated to carry the information. For example, many telecommunication companies use optical fiber to transmit telephone signals, internet communication, and cable television signals. But the cost of deploying optical fibers for fiber-optic communication may be prohibitive. As such, techniques have been developed to more efficiently use the bandwidth available within a single optical fiber. Wavelength-division multiplexing is one such technique that bundles multiple optical carrier signals onto a single optical fiber using different wavelengths.

BRIEF SUMMARY

In some embodiments, a non-transitory computer-readable medium having computer-executable instructions stored thereon is provided. The instructions, in response to execution by one or more processors of a computing system, cause the computing system to perform actions for designing a physical device, the actions comprising: receiving, by the computing system, a design specification that includes an input location, an output location, and at least one performance goal; generating, by the computing system, an initial design based on the design specification, wherein the initial design includes an input waveguide starting at the input location and extending to a end position, an output waveguide starting at a start position and extending to the output location, and a dispersive region; determining, by the computing system, a set of structural parameters based on the initial design; simulating, by the computing system, performance of the initial design using the set of structural parameters to determine a performance loss value based on the at least one performance goal; and updating, by the computing system, at least one of the end position of the input waveguide, the start position of the output waveguide, or a size of the dispersive region in the initial design using a gradient of the performance loss value.

In some embodiments, a computer-implemented method for designing a physical device is provided. A computing system receives a design specification that includes an input location, an output location, and at least one performance goal. The computing system generates an initial design based on the design specification. The initial design includes an input waveguide starting at the input location and extending to a end position, an output waveguide starting at a start position and extending to the output location, and a dispersive region. The computing system determines a set of structural parameters based on the initial design. The computing system simulates performance of the initial design using the set of structural parameters to determine a performance loss value based on the at least one performance goal. The computing system updates at least one of the end position of the input waveguide, the start position of the output waveguide, or a size of the dispersive region in the initial design using a gradient of the performance loss value.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1:
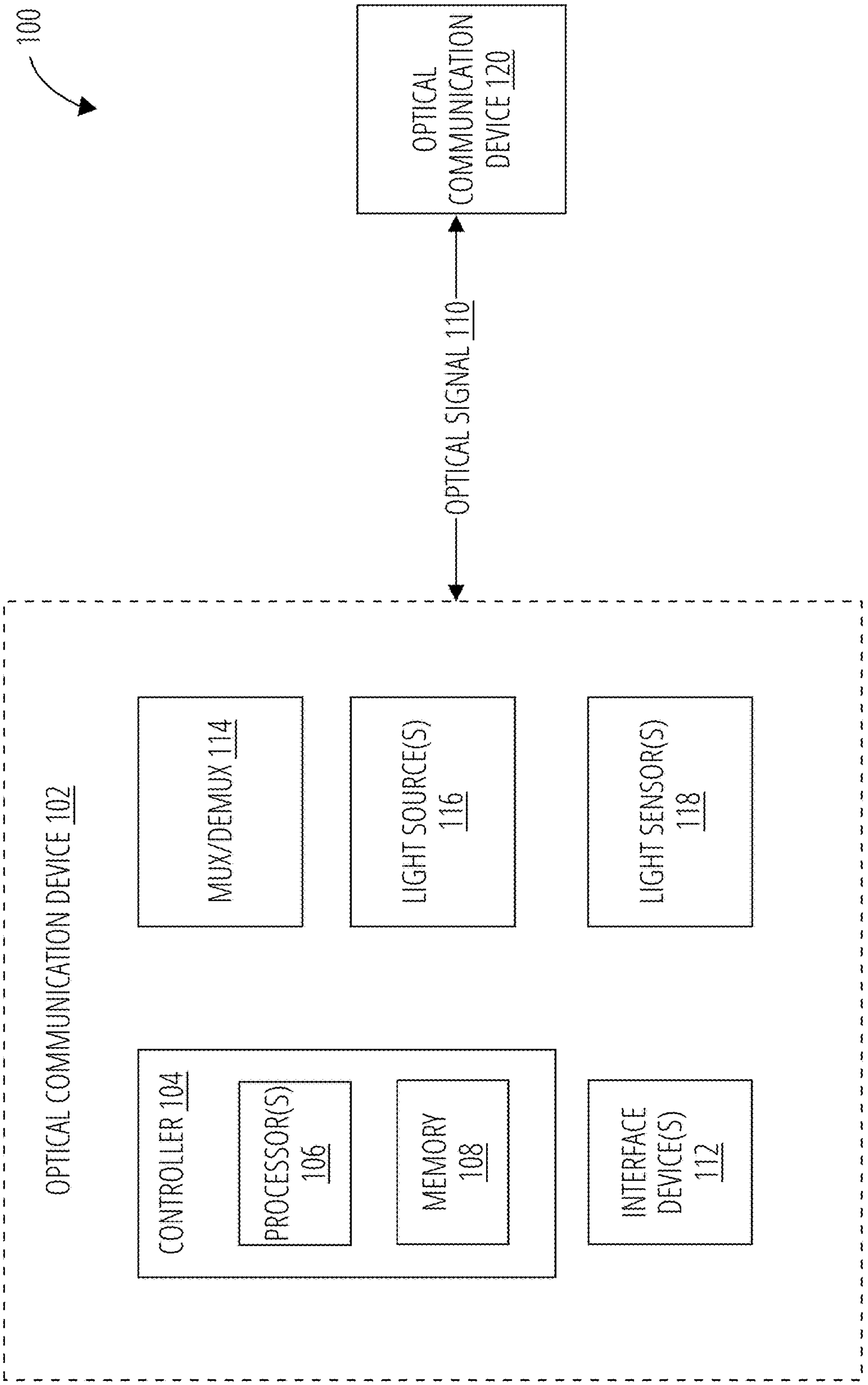
FIG. 1 is a functional block diagram illustrating a non-limiting example embodiment of a system for optical communication between two optical communication devices via an optical signal, according to various aspects of the present disclosure.

Embodiments of techniques for inverse design of physical devices are described herein, in the context of generating designs for photonic integrated circuits (including circuits that include a multi-channel photonic demultiplexer or multiplexer, and/or one or more waveguide bends). In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to “one embodiment” or “an embodiment” means that a particular feature, structure, or characteristic described in connection with the embodiment is included in at least one embodiment of the present invention. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

Wavelength division multiplexing and its variants (e.g., dense wavelength division multiplexing, coarse wavelength division multiplexing, and the like) take advantage of the bandwidth of optical fibers by bundling multiple optical carrier signals onto a single optical fiber. Once the multiple carrier signals are bundled together, they are transmitted from one place to another over the single optical fiber where they may be demultiplexed to be read out by an optical communication device. However, devices that decouple the carrier signals from one another remain prohibitive in terms of cost, size, and the like.

Moreover, design of photonic devices, such as those used for optical communication, are traditionally designed via conventional techniques sometimes determined through a simple guess and check method or manually-guided grid-search in which a small number of design parameters from pre-determined designs or building blocks are adjusted for suitability to a particular application. However, in actuality, these devices may have design parameters ranging from hundreds all the way to many billions or more, dependent on the device size and functionality. Thus, as functionality of photonic devices increases and manufacturing tolerances improve to allow for smaller device feature sizes, it becomes increasingly important to take full advantage of these improvements via optimized device design.

Described herein are embodiments of a photonic integrated circuit that includes one or more components (e.g., a multi-channel photonic demultiplexer, photonic multiplexer, a waveguide bend, etc.) having a design obtainable by an inverse design process, and techniques for the design thereof. More specifically, techniques described in embodiments herein utilize gradient-based optimization in combination with first-principle simulations to generate a design from an understanding of the underlying physics that are expected to govern the operation of the photonic integrated circuit. It is appreciated in other embodiments, design optimization of photonic integrated circuits without gradient-based techniques may also be used. Advantageously, embodiments and techniques described herein are not limited to conventional techniques used for design of photonic devices, in which a small number of design parameters for pre-determined building blocks are adjusted based on suitability to a particular application. Rather, the first-principles based designs described herein are not necessarily dependent on human intuition and generally may result in designs which outstrip current state-of-the-art designs in performance, size, robustness, or a combination thereof. Further still, rather than being limited to a small number of design parameters due to conventional techniques, the embodiments and techniques described herein may provide scalable optimization of a nearly unlimited number of design parameters. It will also be appreciated that, though the design and fabrication of photonic integrated circuits is described throughout the present text, similar inverse design techniques may be used to generate designs for other types of physical devices.

FIG. 1 is a functional block diagram illustrating a system 100 for optical communication (e.g., via wavelength division multiplexing or other techniques) between optical communication device 102 and optical communication device 120 via optical signal 110, in accordance with various aspects of the present disclosure. More generally, optical communication device 102 is configured to transmit information by modulating light from one or more light sources into a multi-channel optical signal 110 (e.g., a singular optical signal that includes a plurality of distinct wavelength channels) that is subsequently transmitted from optical communication device 102 to optical communication device 120 via an optical fiber, a light guide, a wave guide, or other photonic device. Optical communication device 120 receives the multi-channel optical signal 110 and demultiplexes each of the plurality of distinct wavelength channels from the multi-channel optical signal 110 to extract the transmitted information. It is appreciated that in some embodiments optical communication device 102 and optical communication device 120 may be distinct and separate devices (e.g., an optical transceiver or transmitter communicatively coupled via one or more optical fibers to a separate optical transceiver or receiver). However, in other embodiments, optical communication device 102 and optical communication device 120 may be part of a singular component or device (e.g., a smartphone, a tablet, a computer, optical device, or the like). For example, optical communication device 102 and optical communication device 120 may both be constituent components on a monolithic integrated circuit that are coupled to one another via a waveguide that is embedded within the monolithic integrated circuit and is adapted to carry optical signal 110 between optical communication device 102 and optical communication device 120 or otherwise transmit the optical signal between one place and another.

In the illustrated embodiment, optical communication device 102 includes a controller 104, one or more interface device(s) 112 (e.g., fiber optic couplers, light guides, waveguides, and the like), a multiplexer (mux), demultiplexer (demux), or combination thereof (MUX/DEMUX 114), one or more light source(s) 116 (e.g., light emitting diodes, lasers, and the like), and one or more light sensor(s) 118 (e.g., photodiodes, phototransistors, photoresistors, and the like) coupled to one another. The controller includes one or more processor(s) 106 (e.g., one or more central processing units, application specific circuits, field programmable gate arrays, or otherwise) and memory 108 (e.g., volatile memory such as DRAM and SAM, non-volatile memory such as ROM, flash memory, and the like). It is appreciated that optical communication device 120 may include the same or similar elements as optical communication device 102, which have been omitted for clarity.

Controller 104 orchestrates operation of optical communication device 102 for transmitting and/or receiving optical signal 110 (e.g., a multi-channel optical signal having a plurality of distinct wavelength channels or otherwise). Controller 104 includes software (e.g., instructions included in memory 108 coupled to processor 106) and/or hardware logic (e.g., application specific integrated circuits, field-programmable gate arrays, and the like) that when executed by controller 104 causes controller 104 and/or optical communication device 102 to perform operations.

In one embodiment, controller 104 may choreograph operations of optical communication device 102 to cause light source(s) 116 to generate a plurality of distinct wavelength channels that are multiplexed via MUX/DEMUX 114 into a multi-channel optical signal 110 that is subsequently transmitted to optical communication device 120 via interface device 112. In other words, light source(s) 116 may output light having different wavelengths (e.g., 1271 nm, 1291 nm, 1311 nm, 1331 nm, 1506 nm, 1514 nm, 1551 nm, 1571, or otherwise) that may be modulated or pulsed via controller 104 to generate a plurality of distinct wavelength channels representative of information. The plurality of distinct wavelength channels are subsequently combined or otherwise multiplexed via MUX/DEMUX 114 into a multi-channel optical signal 110 that is transmitted to optical communication device 120 via interface device 112. In the same or another embodiment, controller 104 may choreograph operations of optical communication device 102 to cause a plurality of distinct wavelength channels to be demultiplexed via MUX/DEMUX 114 from a multi-channel optical signal 110 that is received via interface device 112 from optical communication device 120.

It is appreciated that in some embodiments certain elements of optical communication device 102 and/or optical communication device 120 may have been omitted to avoid obscuring certain aspects of the disclosure. For example, optical communication device 102 and optical communication device 120 may include amplification circuitry, lenses, or components to facilitate transmitting and receiving optical signal 110. It is further appreciated that in some embodiments optical communication device 102 and/or optical communication device 120 may not necessarily include all elements illustrated in FIG. 1. For example, in one embodiment optical communication device 102 and/or optical communication device 120 are passive devices that operate as an intermediary device that may passively multiplex a plurality of distinct wavelength channels into a multi-channel optical signal 110 and/or demultiplex a plurality of distinct wavelength channels from a multi-channel optical signal 110.

Figure 2A:
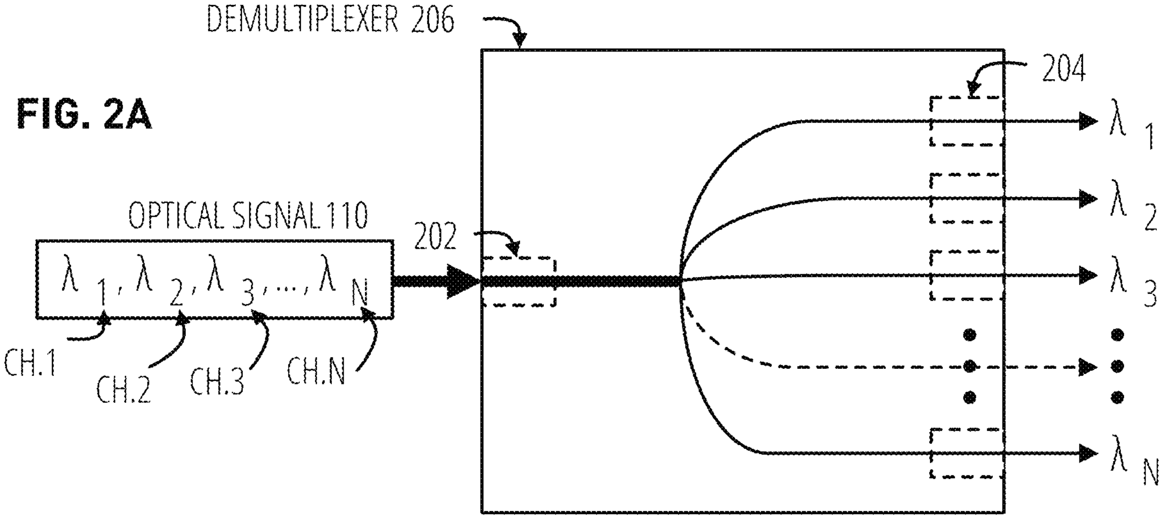
FIG. 2A and FIG. 2B respectively illustrate a non-limiting example embodiment of a demultiplexer and multiplexer, according to various aspects of the present disclosure.
Figure 2B:
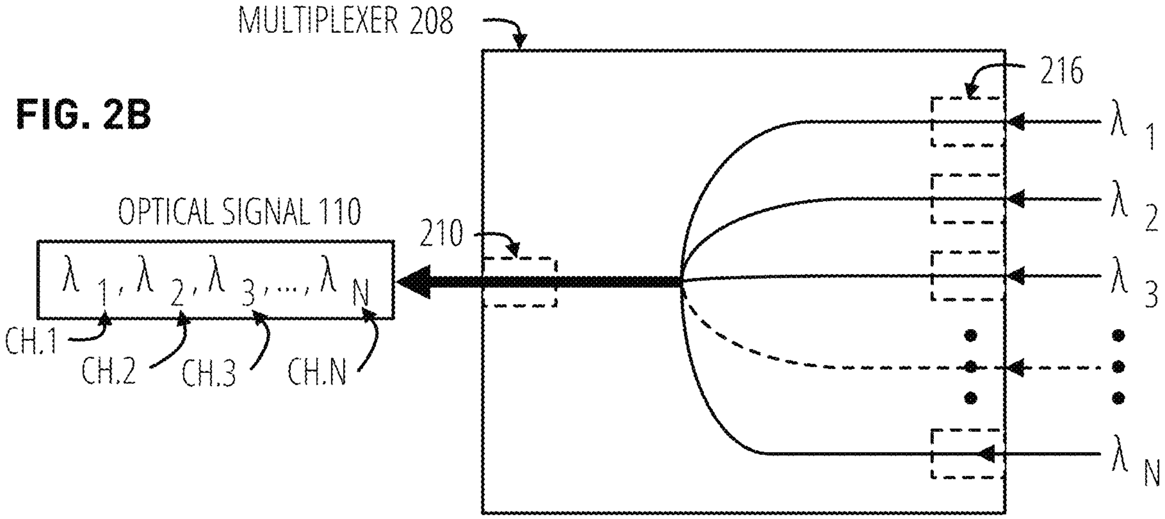

FIG. 2A and FIG. 2B respectively illustrate an example demultiplexer 206 and multiplexer 208, in accordance with various aspects of the present disclosure. Demultiplexer 206 and multiplexer 208 are possible embodiments of MUX/DEMUX 114 illustrated in FIG. 1, and which may be part of an integrated photonic circuit, silicon photonic device, or otherwise As illustrated in FIG. 2A, demultiplexer 206 includes an input region 202 and a plurality of output regions 204. Demultiplexer 206 is configured to receive a multi-channel optical signal 110 that includes a plurality of distinct wavelength channels (e.g., Ch. 1, Ch. 2, Ch. 3, . . . Ch. N, each having a center wavelength respectively corresponding to $\lambda_1$, $\lambda_2$, $\lambda_3$, . . . $\lambda_N$) via input region 202 (e.g., a waveguide that may correspond to interface device 112 illustrated in FIG. 1) to optically separate each of the plurality of distinct wavelength channels from the multi-channel optical signal 110 and respectively guide each of the plurality of distinct wavelength channels to a corresponding one of a plurality of output regions 204 (e.g., a plurality of waveguides that may correspond to interface device(s) 112 illustrated in FIG. 1). More specifically, in the illustrated embodiment, each of the output regions 204 receives a portion of the multi-channel optical signal that corresponds to, or is otherwise representative of, one of the plurality of distinct wavelength channels that may be output as plurality of optical signals (e.g., $\lambda_1$, $\lambda_2$, $\lambda_3$, . . . $\lambda_N$). The plurality of output regions 204 may each be coupled to a respective light sensor (e.g., corresponding to light sensor(s) 118 illustrated in FIG. 1), which may be utilized to convert the optical signals demultiplexed from the multi-channel optical signal 110 into electrical signals for further processing.

In the illustrated embodiment of FIG. 2B, multiplexer 208 includes a plurality of input regions 216 and an output region 210. Multiplexer 208 is configured to receive a plurality of distinct optical signals (e.g., $\lambda_1$, $\lambda_2$, $\lambda_3$, . . . $\lambda_N$), each at a respective one of the plurality of input regions 216 (e.g., a plurality of waveguides that may correspond to interface device(s) 112 illustrated in FIG. 1). Multiplexer 208 is structured or otherwise configured to optically combine (i.e., multiplex) each of the plurality of distinct wavelength channels into a multi-channel optical signal 110 that is guided to output region 210 (e.g., a waveguide that may correspond to interface device 112 illustrated in FIG. 1). It is appreciated that in some embodiments, demultiplexer 206 illustrated in FIG. 2A and multiplexer 208 illustrated in FIG. 2B may be bidirectional such that each device may function as both a demultiplexer and multiplexer.

Figure 2C:
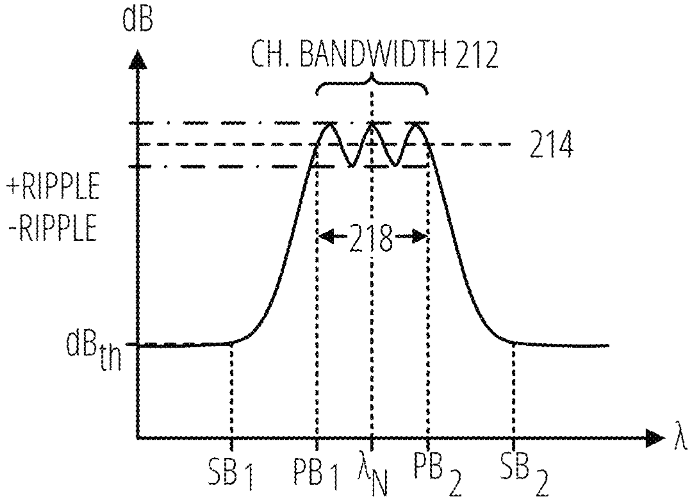
FIG. 2C illustrates a non-limiting example embodiment of a distinct wavelength channel of a multi-channel optical signal, according to various aspects of the present disclosure.

FIG. 2C illustrates an example distinct wavelength channel of a multi-channel optical signal (e.g., Ch. N is multi-channel optical signal 110 illustrated in FIG. 1, FIG. 2A, and FIG. 2B), in accordance with various aspects of the present disclosure. The example channel may be representative of an individual channel included in a plurality of distinct wavelength channels of the multi-channel optical signal that may be demultiplexed and/or multiplexed by demultiplexer 206 of FIG. 2A and/or multiplexer 208 of FIG. 2B. Each of the distinct wavelength channels may have different center wavelengths ($\lambda_N$) including at least one of 1271 nm, 1291 nm, 1311 nm, 1331 nm, 1506 nm, 1514 nm, 1551 nm, or 1571 nm, or otherwise. In the illustrated embodiment of FIG. 2C, the distinct wavelength channel has a channel bandwidth 212 of approximately 13 nm wide. However, in other embodiments the channel bandwidth may be different than 13 nm wide. Rather, the channel bandwidth may be considered a configurable parameter that is dependent upon the structure of MUX/DEMUX 114 of FIG. 1, demultiplexer 206 of FIG. 2A, and/or multiplexer 208 of FIG. 2B. For example, in some embodiments each of the plurality of distinct wavelength channels may share a common bandwidth that may correspond to 13 nm or otherwise. Referring back to FIG. 2C, the channel bandwidth 212 may be defined as the width of a passband region 218 (i.e., the region defined as being between $PB_1$ and $PB_2$). The passband region 218 may represent an approximate power transmission of a demultiplexer or multiplexer. It is appreciated that in some embodiments the passband region 218 may include ripple as illustrated in FIG. 2C, which corresponds to fluctuations within the passband region 218. In one or more embodiments, the ripple within the passband region around a central value 214 may be +/−2 dB or less, +/−1 dB or less, +/−0.5 dB or less, or otherwise. In some embodiments, the channel bandwidth 212 may be defined by the passband region 218. In other embodiments, the channel bandwidth 212 may be defined as the measured power above a threshold (e.g., $dB_{th}$). For example, demultiplexer 206 illustrated in FIG. 2A may optically separate channel N from multi-channel optical signal 110 and have a corresponding channel bandwidth for channel N equivalent to the range of wavelengths above a threshold value that are transmitted to the output region 204 mapped to channel N (i.e., $\lambda_N$). In the same or other embodiments, isolation of the channel (i.e., defined by channel bandwidth 212) may also be considered when optimizing the design. The isolation may be defined as a ratio between the passband region 218 and the stopband regions (e.g., regions less than $SB_1$ and greater than $SB_2$). It is further appreciated that transition band regions (e.g., a first transition region between $SB_1$ and $PB_1$ and a second transition region between $PB_2$ and $SB_2$) are exemplary and may be exaggerated for the purposes of illustration. In some embodiments, optimization of the design of the photonic demultiplexer may also include a target metric for a slope, width, or the like of the transition band regions.

FIG. 3A-FIG. 3D illustrate different views of an example photonic demultiplexer, in accordance with an embodiment of the present disclosure. Photonic demultiplexer 316 is one possible implementation of MUX/DEMUX 114 illustrated in FIG. 1 and demultiplexer 206 illustrated in FIG. 2A. It is further appreciated that while discussion henceforth may be directed towards photonic integrated circuits capable of demultiplexing a plurality of distinct wavelength channels from a multi-channel optical signal, that in other embodiments, a demultiplexer (e.g., demultiplexer 316) may also or alternatively be capable of multiplexing a plurality of distinct wavelength channels into a multi-channel optical signal, in accordance with embodiments of the present disclosure.

Figure 3A:
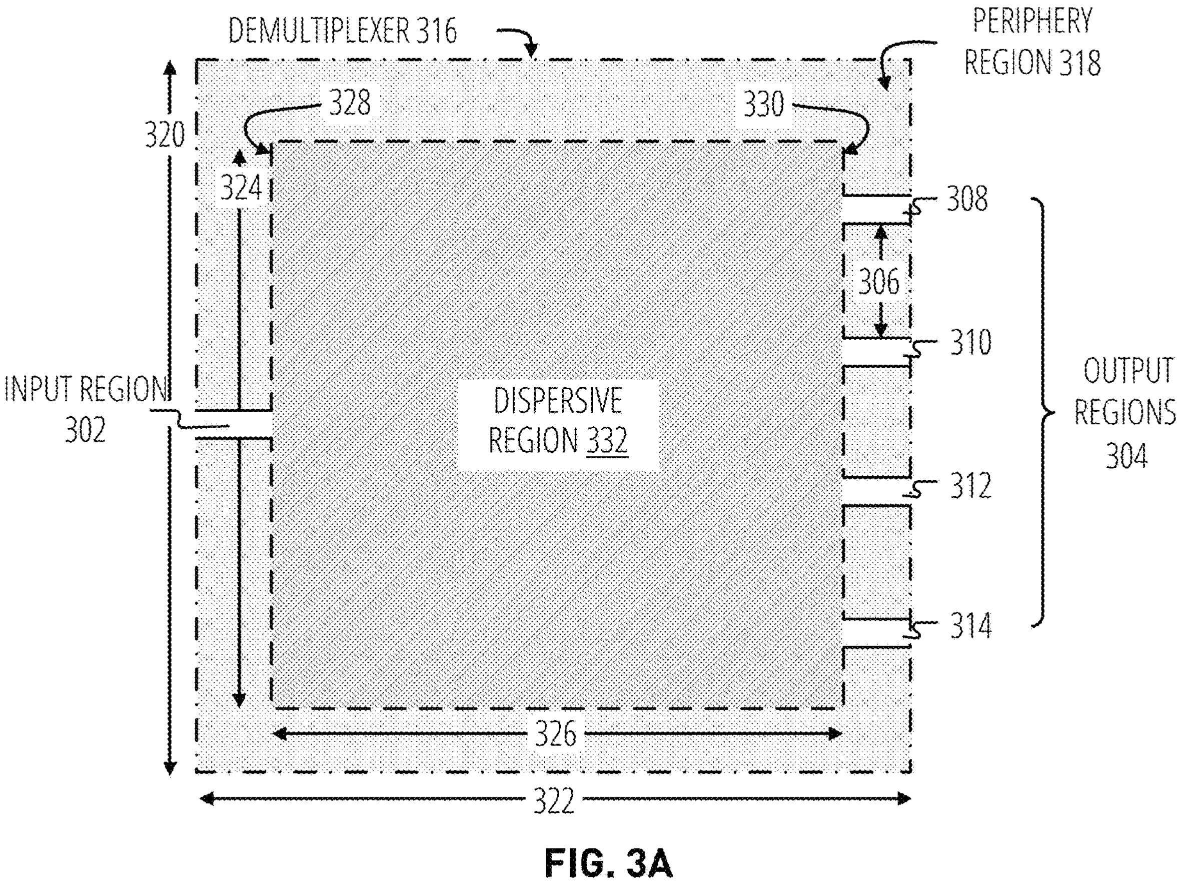
FIG. 3A-FIG. 3D illustrate different views of a non-limiting example embodiment of a photonic demultiplexer, according to various aspects of the present disclosure.

FIG. 3A illustrates a cross-sectional view of demultiplexer 316 along a lateral plane within an active layer defined by a width 320 and a length 322 of the demultiplexer 316. As illustrated, demultiplexer 316 includes an input region 302 (e.g., comparable to input region 202 illustrated in FIG. 2A), a plurality of output regions 304 (e.g., comparable to plurality of output regions 204 illustrated in FIG. 2A), and a dispersive region optically disposed between the input region 302 and plurality of output regions 304. The input region 302 and plurality of output regions 304 (e.g., output region 308, output region 310, output region 312, and output region 314) may each be waveguides (e.g., slab waveguide, strip waveguide, slot waveguide, or the like) capable of propagating light along the path of the waveguide. The dispersive region 332 includes a first material and a second material (see, e.g., FIG. 3D) inhomogeneously interspersed to form a plurality of interfaces that each correspond to a change in refractive index of the dispersive region 332 and collectively structure the dispersive region 332 to optically separate each of a plurality of distinct wavelength channels (e.g., Ch. 1, Ch. 2, Ch. 3, . . . Ch. N illustrated in FIG. 2A) from a multi-channel optical signal (e.g., optical signal 110 illustrated in FIG. 2A) and respectively guide each of the plurality of distinct wavelength channels to a corresponding one of the plurality of output regions 304 when the input region 302 receives the multi-channel optical signal. In other words, input region 302 is adapted to receive the multi-channel optical signal including a plurality of distinct wavelength channels and the plurality of output regions 304 are adapted to each receive a corresponding one of the plurality of distinct wavelength channels demultiplexed from the multi-channel optical signal via dispersive region 332.

Figures 3B, 3C, 3D:
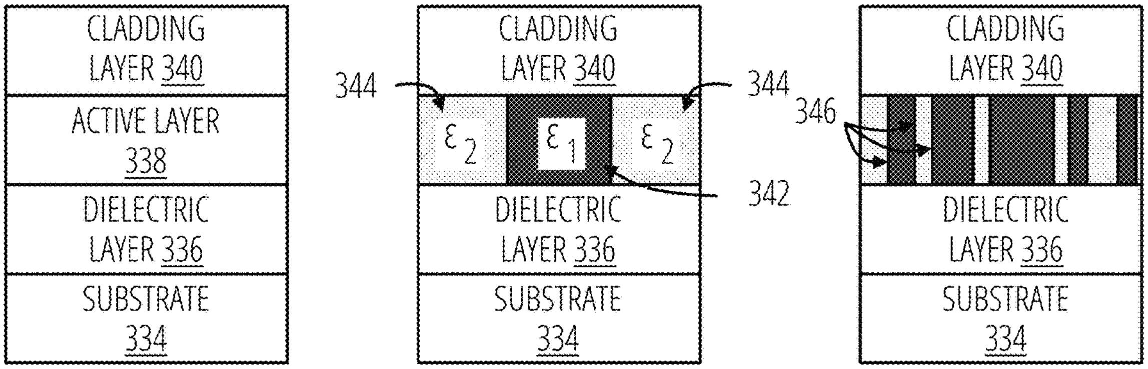
Figure 4A:
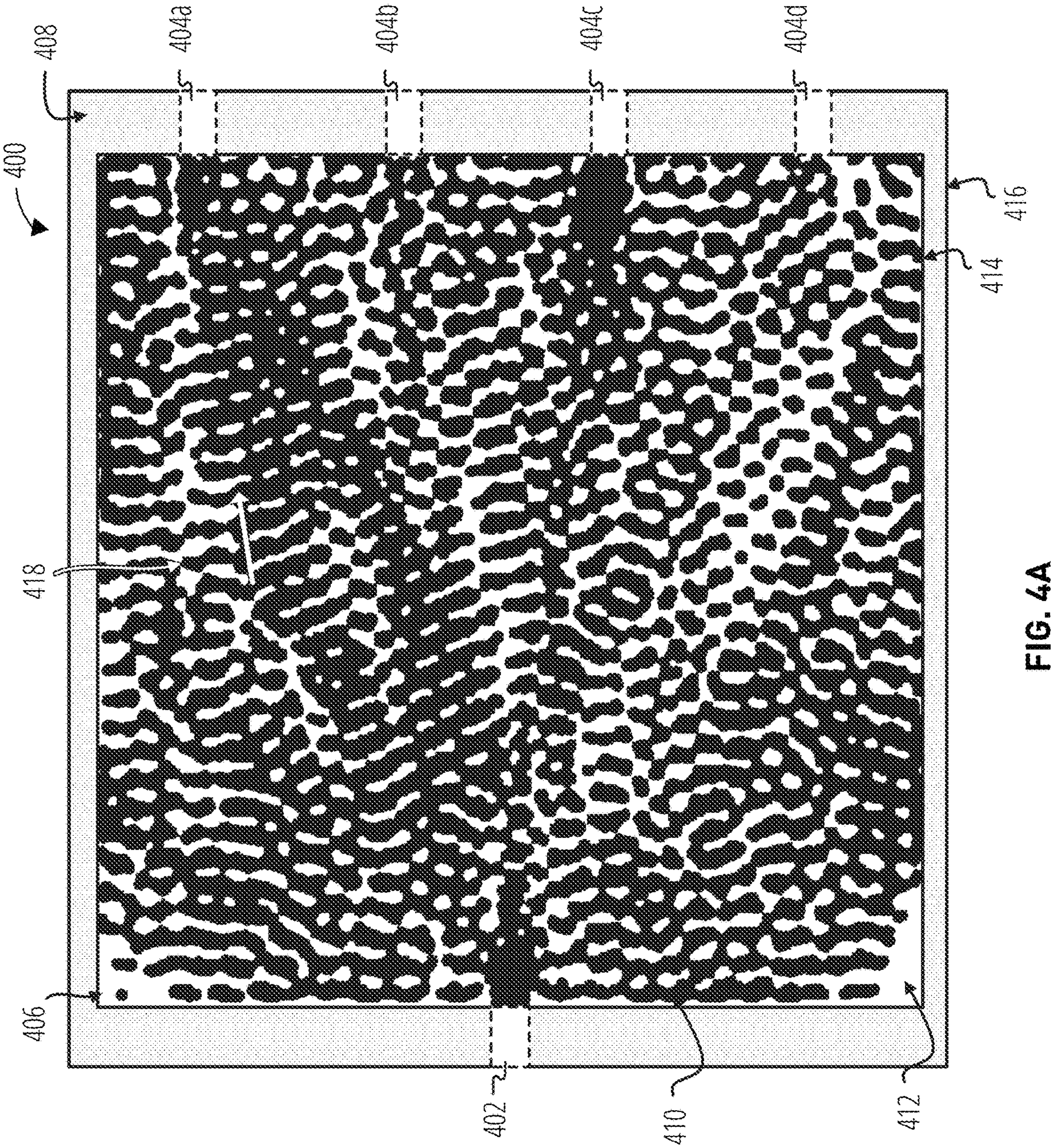
FIG. 4A and FIG. 4B illustrate a more detailed cross-sectional view of a dispersive region of a non-limiting example embodiment of a photonic demultiplexer, according to various aspects of the present disclosure.
Figure 4B:
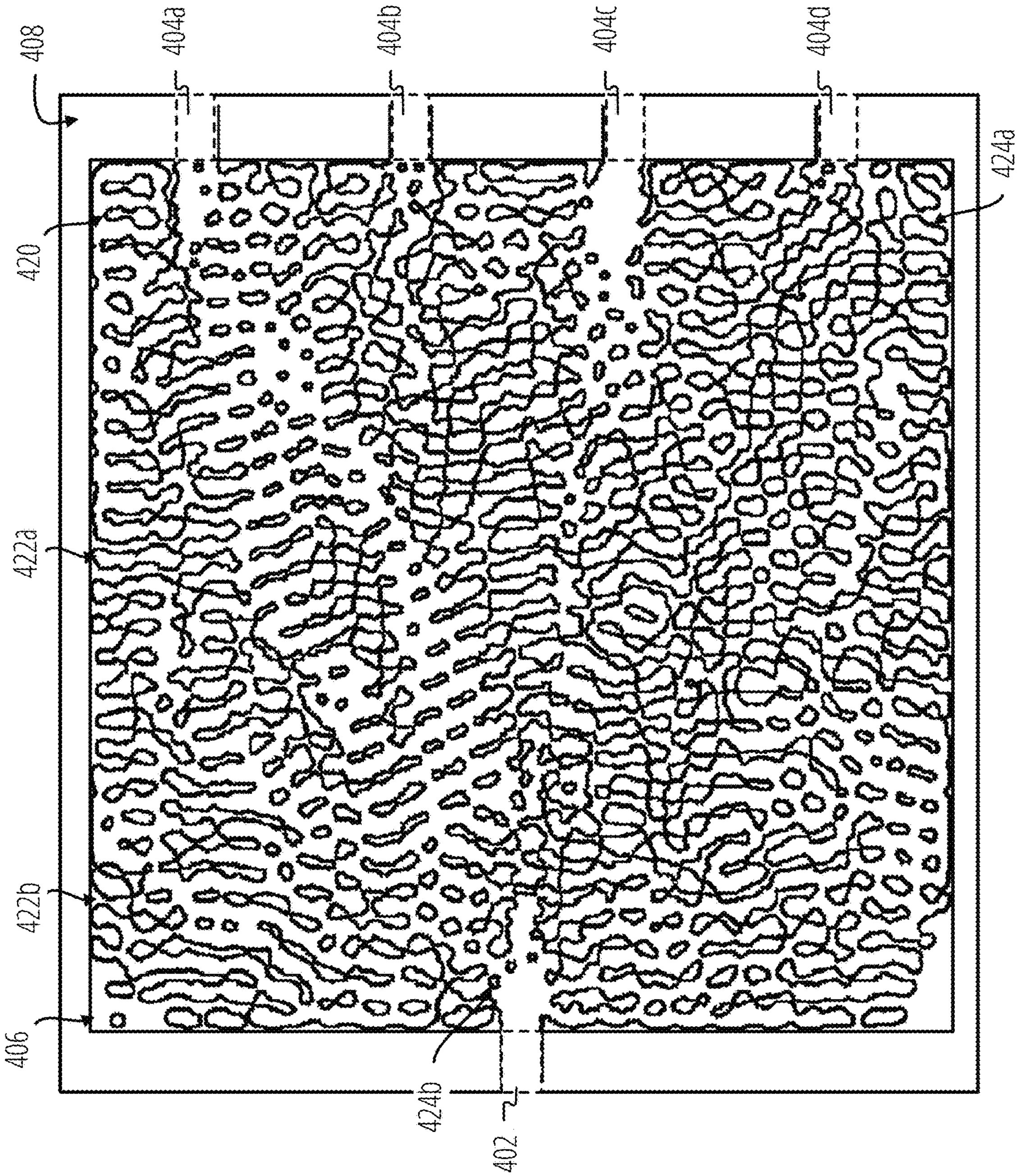

As illustrated in FIG. 3A, and more clearly shown in FIG. 3D and FIG. 4A-FIG. 4B, the shape and arrangement of the first and second material that are inhomogeneously interspersed create a plurality of interfaces that collectively form a material interface pattern along a cross-sectional area of dispersive region 332 that is at least partially surrounded by a periphery region 318 that includes the second material. In some embodiments periphery region 318 has a substantially homogeneous composition that includes the second material. In the illustrated embodiment, dispersive region 332 includes a first side 328 and a second side 330 that each interface with an inner boundary (i.e., the unlabeled dashed line of periphery region 318 disposed between dispersive region 332 and dashed-dotted line corresponding to an outer boundary of periphery region 318). First side 328 and second side 330 are disposed correspond to opposing sides of dispersive region 332. Input region 302 is disposed proximate to first side 328 (e.g., one side of input region 302 abuts first side 328 of dispersive region 332) while each of the plurality of output regions 304 are disposed proximate to second side 330 (e.g., one side of each of the plurality of output regions 304 abuts second side 330 of dispersive region 332).

In the illustrated embodiment each of the plurality of output regions 304 are parallel to each other one of the plurality of output regions 304. However, in other embodiments the plurality of output regions 304 may not be parallel to one another or even disposed on the same side (e.g., one or more of the plurality of output regions 304 and/or input region 302 may be disposed proximate to sides of dispersive region 332 that are adjacent to first side 328 and/or second side 330). In some embodiments adjacent ones of the plurality of output regions are separated from each other by a common separation distance when the plurality of output regions includes at least three output regions. For example, as illustrated adjacent output region 308 and output region 310 are separated from one another by distance 306, which may be common to the separation distance between other pairs of adjacent output regions.

As illustrated in the embodiment of FIG. 3A, demultiplexer 316 includes four output regions 304 (e.g., output region 308, output region 310, output region 312, output region 314) that are each respectively mapped (i.e., by virtue of the structure of dispersive region 332) to a respective one of four channels included in a plurality of distinct wavelength channels. More specifically, the plurality of interfaces of dispersive region 332, defined by the inhomogeneous interspersion of a first material and a second material, form a material interface pattern along a cross-sectional area of the dispersive region 332 (e.g., as illustrated in FIG. 3A, FIG. 4A, or FIG. 4B) to cause the dispersive region 332 to optically separate each of the four channels from the multi-channel optical signal and route each of the four channels to a respective one of the four output regions 304 when the input region 302 regions the multi-channel optical signal.

It is noted that the first material and second material of dispersive region 332 are arranged and shaped within the dispersive region such that the material interface pattern is substantially proportional to a design obtainable with an inverse design process, which will be discussed in greater detail later in the present disclosure. More specifically, in some embodiments, the inverse design process may include iterative gradient-based optimization of a design based at least in part on a loss function that incorporates a performance loss (e.g., to enforce functionality) and a fabrication loss (e.g., to enforce fabricability and binarization of a first material and a second material) that is reduced or otherwise adjusted via iterative gradient-based optimization to generate the design. In the same or other embodiment, other optimization techniques may be used instead of, or jointly with, gradient-based optimization. Advantageously, this allows for optimization of a near unlimited number of design parameters to achieve functionality and performance within a predetermined area that may not have been possible with conventional design techniques.

For example, in one embodiment dispersive region 332 is structured to optically separate each of the four channels from the multi-channel optical signal within a predetermined area of 35 μm×35 μm (e.g., as defined by width 324 and length 326 of dispersive region 332) when the input region 302 receives the multi-channel optical signal. In the same or another embodiment, the dispersive region is structured to accommodate a common bandwidth for each of the four channels, each of the four channels having different center wavelengths. In one embodiment the common bandwidth is approximately 13 nm wide and the different center wavelengths is selected from a group consisting of 1271 nm, 1291 nm, 1311 nm, 1331 nm, 1506 nm, 1514 nm, 1551 nm, and 1571 nm. In some embodiments, the entire structure of demultiplexer 316 (e.g., including input region 302, periphery region 318, dispersive region 332, and plurality of output regions 304) fits within a predetermined area (e.g., as defined by width 320 and length 322). In one embodiment the predetermined area is 35 μm×35 μm. It is appreciated that in other embodiments dispersive region 332 and/or demultiplexer 316 fits within other areas greater than or less than 35 μm×35 μm, which may result in changes to the structure of dispersive region 332 (e.g., the arrangement and shape of the first and second material) and/or other components of demultiplexer 316.

In the same or other embodiments the dispersive region is structured to have a power transmission of −2 dB or greater from the input region 302, through the dispersive region 332, and to the corresponding one of the plurality of output regions 304 for a given wavelength within one of the plurality of distinct wavelength channels. For example, if channel 1 of a multi-channel optical signal is mapped to output region 308, then when demultiplexer 316 receives the multi-channel optical signal at input region 302 the dispersive region 332 will optically separate channel 1 from the multi-channel optical signal and guide a portion of the multi-channel optical signal corresponding to channel 1 to output region 308 with a power transmission of −2 dB or greater. In the same or another embodiment, dispersive region 332 is structured such that an adverse power transmission (i.e., isolation) for the given wavelength from the input region to any of the plurality of output regions other than the corresponding one of the plurality of output regions is −30 dB or less, −22 dB or less, or otherwise. For example, if channel 1 of a multi-channel optical signal is mapped to output region 308, then the adverse power transmission from input region 302 to any other one of the plurality of output regions (e.g., output region 310, output region 312, output region 314) other than the corresponding one of the plurality of output regions (e.g., output region 308) is −30 dB or less, −22 dB or less, or otherwise. In some embodiments, a maximum power reflection from demultiplexer 316 of an input signal (e.g., a multi-channel optical signal) received at an input region (e.g., input region 302) is reflected back to the input region by dispersive region 332 or otherwise is −40 dB or less, −20 dB or less, −8 dB or less, or otherwise. It is appreciated that in other embodiments the power transmission, adverse power transmission, maximum power, or other performance characteristics may be different than the respective values discussed herein, but the structure of dispersive region 332 may change due to the intrinsic relationship between structure, functionality, and performance of demultiplexer 316.

FIG. 3B illustrates a vertical schematic or stack of various layers that are included in the illustrated embodiment of demultiplexer 316. However, it is appreciated that the illustrated embodiment is not exhaustive and that certain features or elements may be omitted to avoid obscuring certain aspects of the invention. In the illustrated embodiment, demultiplexer 316 includes substrate 334, dielectric layer 336, active layer 338 (e.g., as shown in the cross-sectional illustration of FIG. 3A), and a cladding layer 340. In some embodiments, demultiplexer 316 may be, in part or otherwise, a photonic integrated circuit or silicon photonic device that is compatible with conventional fabrication techniques (e.g., lithographic techniques such as photolithographic, electron-beam lithography and the like, sputtering, thermal evaporation, physical and chemical vapor deposition, and the like).

In one embodiment a silicon on insulator (SOI) wafer may be initially provided that includes a support substrate (e.g., a silicon substrate) that corresponds to substrate 334, a silicon dioxide dielectric layer that corresponds to dielectric layer 336, a silicon layer (e.g., intrinsic, doped, or otherwise), and a oxide layer (e.g., intrinsic, grown, or otherwise). In one embodiment, the silicon in the active layer 338 may be etched selectively by lithographically creating a pattern on the SOI wafer that is transferred to SOI wafer via a dry etch process (e.g., via a photoresist mask or other hard mask) to remove portions of the silicon. The silicon may be etched all the way down to dielectric layer 336 to form voids that may subsequently be backfilled with silicon dioxide that is subsequently encapsulated with silicon dioxide to form cladding layer 340. In one embodiment, there may be several etch depths including a full etch depth of the silicon to obtain the targeted structure. In one embodiment, the silicon may be 206 nm thick and thus the full etch depth may be 206 nm. In some embodiments, this may be a two-step encapsulation process in which two silicon dioxide depositions are performed with an intermediate chemical mechanical planarization used to yield a planar surface.

FIG. 3C illustrates a more detailed view of active layer 338 (relative to FIG. 3B) taken along a portion of periphery region 318 that includes input region 302 of FIG. 3A. In the illustrated embodiment, active layer 338 includes a first material 342 with a refractive index of $\varepsilon_1$ and a second material 344 with a refractive index of $\varepsilon_2$ that is different from $\varepsilon_1$. Homogenous regions of the first material 342 and the second material 344 may form waveguides or portions of waveguides that correspond to input region 302 and plurality of output regions 304 as illustrated in FIG. 3A and FIG. 3C.

FIG. 3D illustrates a more detailed view of active layer 338 (relative to FIG. 3B) taken along dispersive region 332. As described previously, active layer 338 includes a first material 342 (e.g., silicon) and a second material 344 (e.g., silicon dioxide) that are inhomogeneously interspersed to form a plurality of interfaces 346 that collectively form a material interface pattern. Each of the plurality of interfaces 346 that form the interface pattern correspond to a change in refractive index of dispersive region 332 to structure the dispersive region (i.e., the shape and arrangement of first material 342 and second material 344) to provide, at least in part, the functionality of demultiplexer 316 (i.e., optical separation of the plurality of distinct wavelength channels from the multi-channel optical signal and respective guidance of each of the plurality of distinct wavelength channels to the corresponding one of the plurality of output regions 304 when the input region 302 receives the multi-channel optical signal).

It is appreciated that in the illustrated embodiments of demultiplexer 316 as shown in FIG. 3A-FIG. 3D, the change in refractive index is shown as being vertically consistent (i.e., the first material 342 and second material 344 form interfaces that are substantially vertical or perpendicular to a lateral plane or cross-section of demultiplexer 316. However, in the same or other embodiments, the plurality of interfaces (e.g., interfaces 346 illustrated in FIG. 3D) may not be substantially perpendicular with the lateral plane or cross-section of demultiplexer 316.

FIG. 4A illustrates a more detailed cross-sectional view of a dispersive region of example photonic demultiplexer 400, in accordance with an embodiment of the present disclosure. FIG. 4B illustrates a more detailed view of an interface pattern formed by the shape and arrangement of a first material 410 and a second material 412 for the dispersive region of the photonic demultiplexer 400 of FIG. 4A. Photonic demultiplexer 400 is one possible implementation of MUX/DEMUX 114 illustrated in FIG. 1, demultiplexer 206 illustrated in FIG. 2A, and demultiplexer 316 illustrated in FIG. 3A-FIG. 3D.

As illustrated in FIG. 4A and FIG. 4B, photonic demultiplexer 400 includes an input region 402, a plurality of output regions **404*a*-404*d*, and a dispersive region 406 optically disposed between input region 402 and plurality of output regions 404*a*-404*d*. Dispersive region 406 is surrounded, at least in part, by a peripheral region 408 that includes an inner boundary 414 and an outer boundary 416. It is appreciated that like named or labeled elements of photonic demultiplexer 400** may similarly correspond to like named or labeled elements of other demultiplexers described in embodiments of the present disclosure.

The first material 410 (i.e., black colored regions within dispersive region 406) and second material 412 (i.e., white colored regions within dispersive region 406) of photonic demultiplexer 400 are inhomogeneously interspersed to create a plurality of interfaces that collectively form material interface pattern 420 as illustrated in FIG. 4B. More specifically, an inverse design process that utilizes iterative gradient-based optimization, Markov Chain Monte Carlo optimization, or other optimization techniques combined with first principles simulations to generate a design that is substantially replicated by dispersive region 406 within a proportional or scaled manner such that photonic demultiplexer 400 provides the desired functionality. In the illustrated embodiment, dispersive region 406 is structured to optically separate each of a plurality of distinct wavelength channels from a multi-channel optical signal and respectively guide each of the plurality of distinct wavelength channels to a corresponding one of the plurality of output regions **404*a*-404*d* when the input region 402 receives the multi-channel optical signal. More specifically, the plurality of output regions 404*a*-404*d* are respectively mapped to wavelength channels having center wavelengths correspond to 1271 nm, 1291 nm, 1311 nm, and 1331 nm. In another embodiment, output regions 404*a*-404*d*** are respectfully mapped to wavelength channels having center wavelengths that correspond to 1506 nm, 1514 nm, 1551 nm, and 1571 nm.

As illustrated in FIG. 4B, material interface pattern 420, which is defined by the black lines within dispersive region 406 and corresponds to a change in refractive index within dispersive region 406, includes a plurality of protrusions **422*a*-422*b*. A first protrusion 422*a* is formed of the first material 410 and extends from peripheral region 408 into dispersive region 406. Similarly, a second protrusion 422*b* is formed of the second material 412 and extends from peripheral region 408 into dispersive region 406. Further illustrated in FIG. 4B, dispersive region 406 includes a plurality of islands 424*a*-424*b* formed of either the first material 410 or the second material 412. The plurality of islands 424*a*-424*b* include a first island 424*a* that is formed of the first material 410 and is surrounded by the second material 412. The plurality of islands 424*a*-424*b* also includes a second island 424*b* that is formed of the second material 412 and is surrounded by the first material 410**.

In some embodiments, material interface pattern 420 includes one or more dendritic shapes, wherein each of the one or more dendritic shapes are defined as a branched structure formed from first material 410 or second material 412 and having a width that alternates between increasing and decreasing in size along a corresponding direction. Referring back to FIG. 4A, for clarity, dendritic structure 418 is labeled with a white arrow having a black border. As can be seen, the width of dendritic structure 418 alternatively increases and decreases in size along a corresponding direction (i.e., the white labeled arrow overlaying a length of dendritic structure 418) to create a branched structure. It is appreciated that in other embodiments there may be no protrusions, there may be no islands, there may be no dendritic structures, or there may be any number, including zero, of protrusions, islands of any material included in the dispersive region 406, dendritic structures, or a combination thereof.

In some embodiments, the inverse design process includes a fabrication loss that enforces a minimum feature size, for example, to ensure fabricability of the design. In the illustrated embodiment of photonic demultiplexer 400 illustrated in FIG. 4A and FIG. 4B, material interface pattern 420 is shaped to enforce a minimum feature size within dispersive region 406 such that the plurality of interfaces within the cross-sectional area formed with first material 410 and second material 412 do not have a radius of curvature with a magnitude of less than a threshold size. For example, if the minimum feature size is 150 nm, the radius of curvature for any of the plurality of interfaces have a magnitude of less than the threshold size, which corresponds the inverse of half the minimum feature size (i.e., $1/75$ nm$^{-1}$). Enforcement of such a minimum feature size prevents the inverse design process from generating designs that are not fabricable by considering manufacturing constraints, limitations, and/or yield. In the same or other embodiments, different or additional checks on metrics related to fabricability may be utilized to enforce a minimum width or spacing as a minimum feature size.

Figure 5:
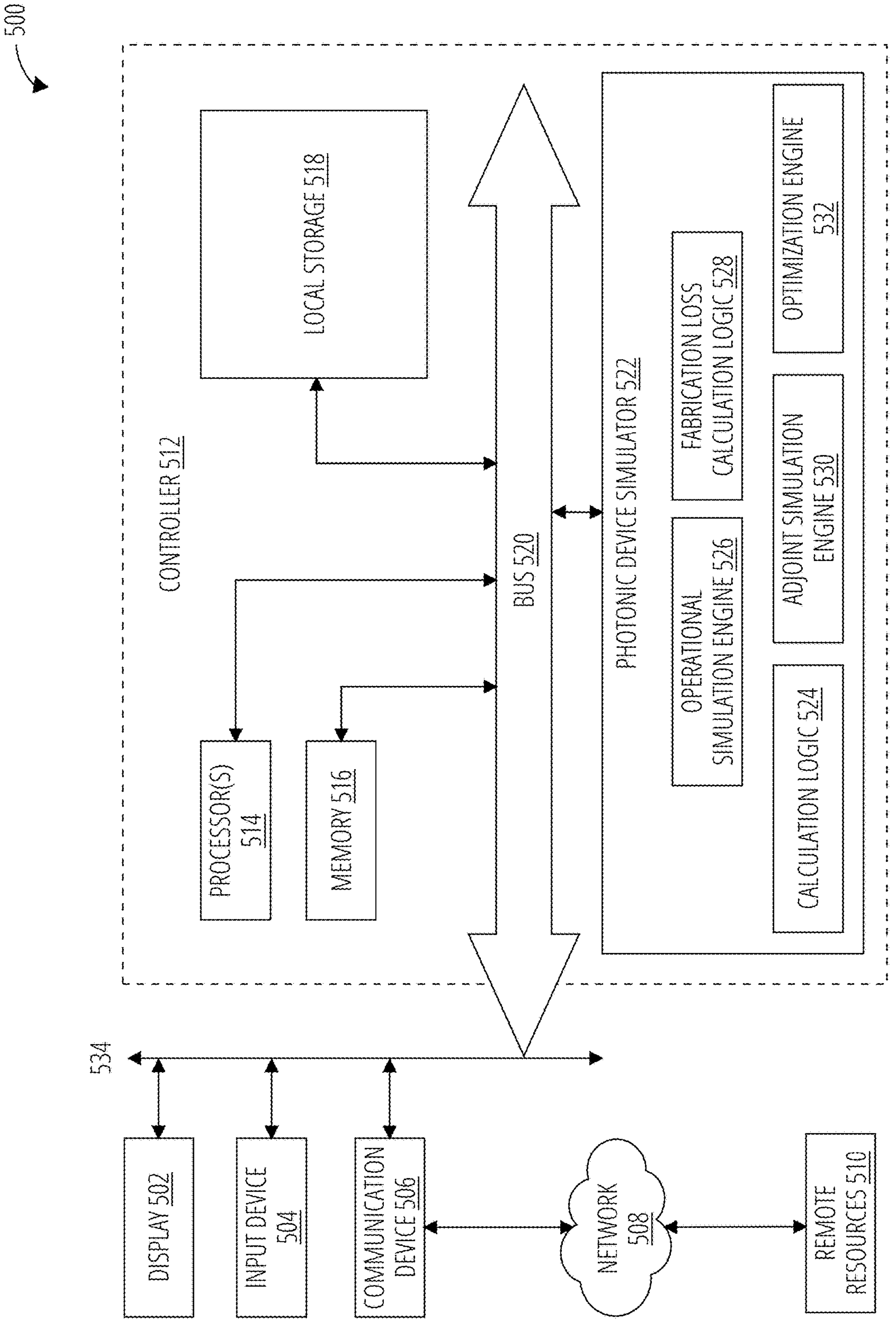
FIG. 5 is a functional block diagram illustrating a non-limiting example embodiment of a system for generating a design of a photonic integrated circuit, according to various aspects of the present disclosure.

FIG. 5 is a functional block diagram illustrating a computing system 500 for generating a design of a photonic integrated circuit (i.e., photonic device), in accordance with an embodiment of the disclosure. Computing system 500 may be utilized to perform an inverse design process that generates a design with iterative gradient-based optimization that takes into consideration the underlying physics that govern the operation of the photonic integrated circuit. More specifically, computing system 500 is a design tool that may be utilized to optimize structural parameters (e.g., shape and arrangement of a first material and a second material within the dispersive region of the embodiments described in the present disclosure) of photonic integrated circuits based on first-principles simulations (e.g., electromagnetic simulations to determine a field response of the photonic device to an excitation source) and iterative gradient-based optimization. In other words, computing system 500 may provide a design obtained via the inverse design process that is substantially replicated (i.e., proportionally scaled) by dispersive region 332 and dispersive region 406 of demultiplexer 316 and photonic demultiplexer 400 illustrated in FIG. 3A and FIG. 4A, respectively.

As illustrated, computing system 500 includes controller 512, display 502, input device(s) 504, communication device(s) 506, network 508, remote resources 510, bus 534, and bus 520. Controller 512 includes processor 514, memory 516, local storage 518, and photonic device simulator 522. Photonic device simulator 522 includes operational simulation engine 526, fabrication loss calculation logic 528, calculation logic 524, adjoint simulation engine 530, and optimization engine 532. It is appreciated that in some embodiments, controller 512 may be a distributed system.

Controller 512 is coupled to display 502 (e.g., a light emitting diode display, a liquid crystal display, and the like) coupled to bus 534 through bus 520 for displaying information to a user utilizing computing system 500 to optimize structural parameters of the photonic device (i.e., demultiplexer). Input device 504 is coupled to bus 534 through bus 520 for communicating information and command selections to processor 514. Input device 504 may include a mouse, trackball, keyboard, stylus, or other computer peripheral, to facilitate an interaction between the user and controller 512. In response, controller 512 may provide verification of the interaction through display 502.

Another device, which may optionally be coupled to controller 512, is a communication device 506 for accessing remote resources 510 of a distributed system via network 508. Communication device 506 may include any of a number of networking peripheral devices such as those used for coupling to an Ethernet, Internet, or wide area network, and the like. Communication device 506 may further include a mechanism that provides connectivity between controller 512 and the outside world. Note that any or all of the components of computing system 500 illustrated in FIG. 5 and associated hardware may be used in various embodiments of the present disclosure. The remote resources 510 may be part of a distributed system and include any number of processors, memory, and other resources for optimizing the structural parameters of the photonic device.

Controller 512 orchestrates operation of computing system 500 for optimizing structural parameters of the photonic device. Processor 514 (e.g., one or more central processing units, graphics processing units, and/or tensor processing units, etc.), memory 516 (e.g., volatile memory such as DRAM and SRAM, non-volatile memory such as ROM, flash memory, and the like), local storage 518 (e.g., magnetic memory such as computer disk drives), and the photonic device simulator 522 are coupled to each other through bus 520. Controller 512 includes software (e.g., instructions included in memory 516 coupled to processor 514) and/or hardware logic (e.g., application specific integrated circuits, field-programmable gate arrays, and the like) that when executed by controller 512 causes controller 512 or computing system 500 to perform operations. The operations may be based on instructions stored within any one of, or a combination of, memory 516, local storage 518, physical device simulator 522, and remote resources 510 accessed through network 508.

In the illustrated embodiment, the components of photonic device simulator 522 are utilized to optimize structural parameters of the photonic device (e.g., MUX/DEMUX 114 of FIG. 1, demultiplexer 206 of FIG. 2A, multiplexer 208 of FIG. 2B, demultiplexer 316 of FIG. 3A-FIG. 3D, and photonic demultiplexer 400 of FIG. 4A-FIG. 4B). In some embodiments, computing system 500 may optimize the structural parameters of the photonic device via, inter alia, simulations (e.g., operational and adjoint simulations) that utilize a finite-difference time-domain (FDTD) method, a finite-difference frequency-domain (FDFD) method, or any other suitable technique to model the field response (e.g., electric and magnetic fields within the photonic device). The operational simulation engine 526 provides instructions for performing an electromagnetic simulation of the photonic device operating in response to an excitation source within a simulated environment. In particular, the operational simulation determines a field response of the simulated environment (and thus the photonic device, which is described by the simulated environment) in response to the excitation source for determining a performance metric of the physical device (e.g., based off an initial description or input design of the photonic device that describes the structural parameters of the photonic device within the simulated environment with a plurality of voxels). The structural parameters may correspond, for example, to the specific design, material compositions, dimensions, and the like of the physical device. Fabrication loss calculation logic 528 provides instructions for determining a fabrication loss, which is utilized to enforce a minimum feature size to ensure fabricability. In some embodiments, the fabrication loss is also used to enforce binarization of the design (i.e., such that the photonic device includes a first material and a second material that are interspersed to form a plurality of interfaces). Calculation logic 524 computes a loss metric determined via a loss function that incorporates a performance loss, based on the performance metric, and the fabrication loss. Adjoint simulation engine 530 is utilized in conjunction with the operational simulation engine 526 to perform an adjoint simulation of the photonic device to backpropagate the loss metric through the simulated environment via the loss function to determine how changes in the structural parameters of the photonic device influence the loss metric. Optimization engine 532 is utilized to update the structural parameters of the photonic device to reduce the loss metric and generate a revised description (i.e., revising the design) of the photonic device.

Figure 6A:
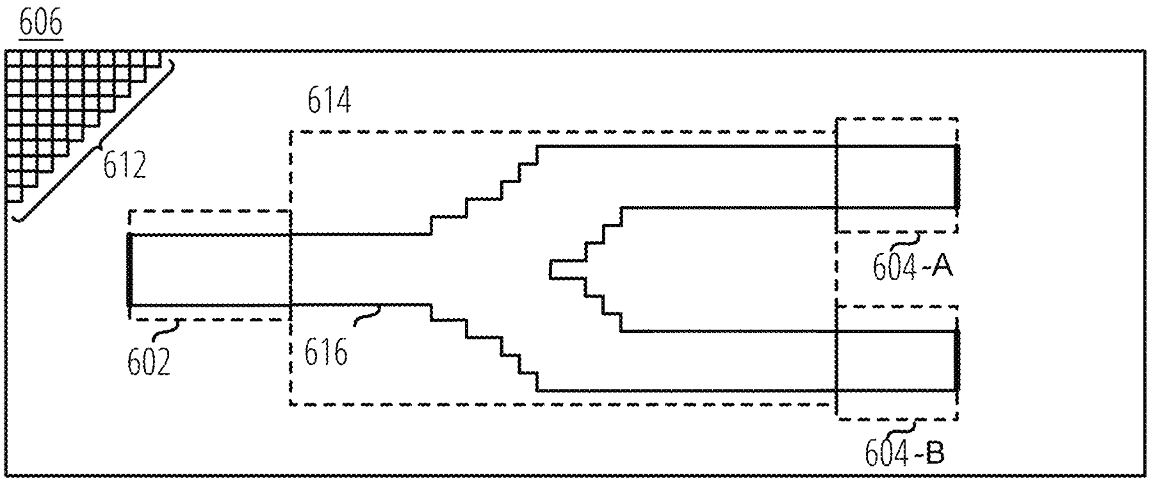
FIG. 6A illustrates a non-limiting example embodiment of a simulated environment describing a photonic integrated circuit, according to various aspects of the present disclosure.
Figure 6B:
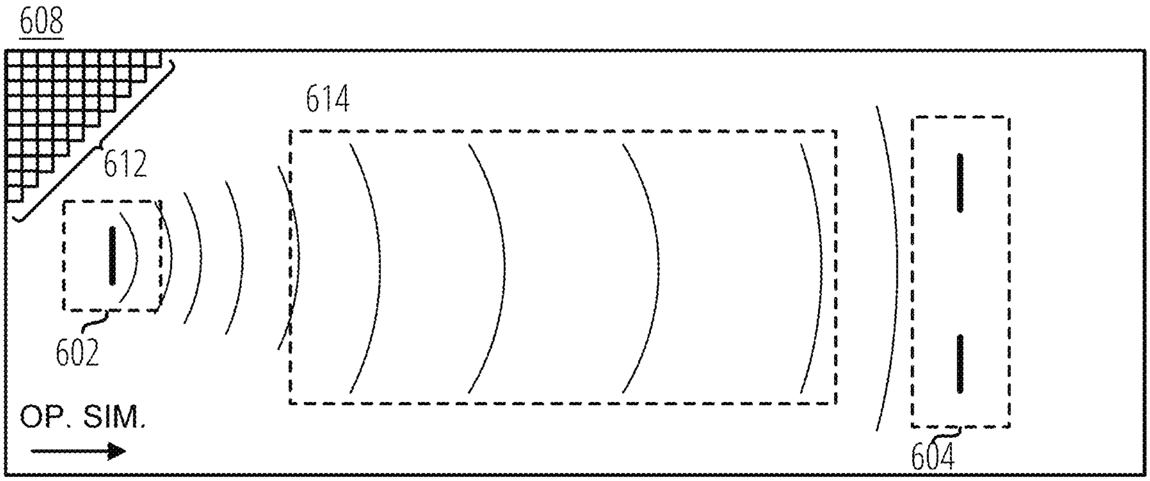
FIG. 6B illustrates a non-limiting example embodiment of an operational simulation of a photonic integrated circuit, according to various aspects of the present disclosure.
Figure 6C:
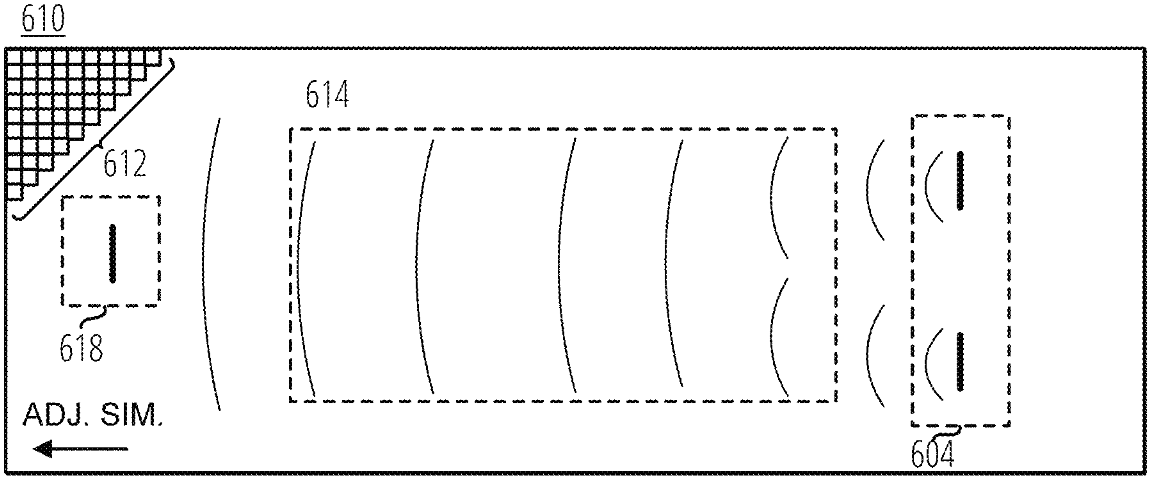
FIG. 6C illustrates a non-limiting example embodiment of an adjoint simulation within the simulated environment by backpropagating a loss value, according to various aspects of the present disclosure.

FIG. 6A-FIG. 6C respectively illustrate non-limiting example embodiments of an initial set up of a simulated environment 606 describing a photonic device, performing an operational simulation of the photonic device in response to an excitation source within the simulated environment 608, and performing an adjoint simulation of the photonic device within the simulated environment 610 according to various aspects of the present disclosure. The initial set up of the simulated environment, 1-dimensional representation of the simulated environment, operational simulation of the physical device, and adjoint simulation of the physical device may be implemented with computing system 500 illustrated in FIG. 5.

As illustrated in FIG. 6A-FIG. 6C, simulated environment is represented in two-dimensions. However, it is appreciated that other dimensionality (e.g., 3-dimensional space) may also be used to describe simulated environment and the photonic device. In some embodiments, optimization of structural parameters of the photonic device illustrated in FIG. 6A-FIG. 6C may be achieved via an inverse design process including, inter alia, simulations (e.g., operational simulations and adjoint simulations) that utilize a finite-difference time-domain (FDTD) method, a finite-difference frequency-domain (FDFD) method, or any other suitable technique to model the field response (e.g., electric and magnetic field) to an excitation source.

FIG. 6A illustrates a demonstrative simulated environment 606 describing a photonic integrated circuit (i.e., a photonic device such as a waveguide, demultiplexer, and the like), in accordance with a non-limiting example embodiment of the present disclosure. More specifically, in response to receiving an initial description of a photonic device defined by one or more structural parameters (e.g., an input design), a system (e.g., computing system 500 of FIG. 5) configures a simulated environment 606 to be representative of the photonic device. As illustrated, the simulated environment 606 (and subsequently the photonic device) is described by a plurality of voxels 612, which represent individual elements (i.e., discretized) of the two-dimensional (or other dimensionality) space. Each of the voxels 612 is illustrated as a two-dimensional square; however, it is appreciated that the voxels may be represented as cubes or other shapes in three-dimensional space. It is appreciated that the specific shape and dimensionality of the plurality of voxels 612 may be adjusted dependent on the simulated environment 606 and photonic device being simulated. It is further noted that only a portion of the plurality of voxels 612 are illustrated to avoid obscuring other aspects of the simulated environment 606.

Each of the plurality of voxels 612 may be associated with a structural value, a field value, and a source value. Collectively, the structural values of the simulated environment 606 describe the structural parameters of the photonic device. In one embodiment, the structural values may correspond to a relative permittivity, permeability, and/or refractive index that collectively describe structural (i.e., material) boundaries or interfaces of the photonic device (e.g., material interface pattern 420 of FIG. 4B). For example, an interface 616 is representative of where relative permittivity changes within the simulated environment 606 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of voxels 612. Thus, the field response may be based, at least in part, on the structural parameters of the photonic device and the excitation source.

In the illustrated embodiment, the photonic device corresponds to an optical demultiplexer having a design region 614 (e.g., corresponding to dispersive region 332 of FIG. 3A, and/or dispersive region 406 of FIG. 4A), in which structural parameters of the physical device may be updated or otherwise revised. More specifically, through an inverse design process, iterative gradient-based optimization of a loss metric determined from a loss function is performed to generate a design of the photonic device that functionally causes a multi-channel optical signal to be demultiplexed and guided from input port 602 to a corresponding one of the output ports 604. Thus, input port 602 (e.g., corresponding to input region 302 of FIG. 3A, input region 402 of FIG. 4A, and the like) of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 606). In other words, the excitation source may cause the field response of the photonic device to change, which is dependent on the underlying physics governing the physical domain and the structural parameters of the photonic device. The excitation source originates or is otherwise proximate to input port 602 and is positioned to propagate (or otherwise influence the field values of the plurality of voxels) through the design region 614 towards output ports 604 of the photonic device. In the illustrated embodiment, the input port 602 and output ports 604 are positioned outside of the design region 614. In other words, in the illustrated embodiment, only a portion of the structural parameters of the photonic device is optimizable.

However, in other embodiments, the entirety of the photonic device may be placed within the design region 614 such that the structural parameters may represent any portion or the entirety of the design of the photonic device. The electric and magnetic fields within the simulated environment 606 (and subsequently the photonic device) may change (e.g., represented by field values of the individual voxels that collectively correspond to the field response of the simulated environment) in response to the excitation source. The output ports 604 of the optical demultiplexer may be used for determining a performance metric of the photonic device in response to the excitation source (e.g., power transmission from input port 602 to a specific one of the output ports 604). The initial description of the photonic device, including initial structural parameters, excitation source, performance parameters or metrics, and other parameters describing the photonic device, are received by the system (e.g., computing system 500 of FIG. 5) and used to configure the simulated environment 606 for performing a first-principles based simulation of the photonic device. These specific values and parameters may be defined directly by a user (e.g., of computing system 500 in FIG. 5), indirectly (e.g., via controller 512 culling pre-determined values stored in memory 516, local storage 518, or remote resources 510), or a combination thereof.

FIG. 6B illustrates a non-limiting example embodiment of an operational simulation of the photonic device in response to an excitation source within simulated environment 608, in accordance with various aspects of the present disclosure. In the illustrated embodiment, the photonic device is an optical demultiplexer structured to optically separate each of a plurality of distinct wavelength channels included in a multi-channel optical signal received at input port 602 and respectively guide each of the plurality of distinct wavelength channels to a corresponding one of the plurality of output ports 604. The excitation source may be selected (randomly or otherwise) from the plurality of distinct wavelength channels and originates at input port 602 having a specified spatial, phase, and/or temporal profile. The operational simulation occurs over a plurality of time steps, including the illustrated time step. When performing the operational simulation, changes to the field response (e.g., the field value) for each of the plurality of voxels 612 are incrementally updated in response to the excitation source over the plurality of time steps. The changes in the field response at a particular time step are based, at least in part, on the structural parameters, the excitation source, and the field response of the simulated environment 610 at the immediately prior time step included in the plurality of time steps. Similarly, in some embodiments the source value of the plurality of voxels 612 is updated (e.g., based on the spatial profile and/or temporal profile describing the excitation source). It is appreciated that the operational simulation is incremental and that the field values (and source values) of the simulated environment 610 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In one embodiment, the performance metric corresponds to the power transmission at a corresponding one of the output ports 604 mapped to the distinct wavelength channel being simulated by the excitation source. In other words, in some embodiments, the performance metric represents power (at one or more frequencies of interest) in the target mode shape at the specific locations of the output ports 604. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on loss metric) for updating or otherwise revising the structural parameters to reduce the loss metric (i.e. increase the performance metric). It is noted that the loss metric may be further based on a fabrication loss value that is utilized to enforce a minimum feature size of the photonic device to promote fabricability of the device, and/or other loss values.

FIG. 6C illustrates a non-limiting example embodiment of an adjoint simulation within simulated environment 610 by backpropagating a loss metric, in accordance with various aspects of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 604) or other location that corresponds to a location used when determining the performance metric. The adjoint source(s) is then treated as a physical stimuli or an excitation source during the adjoint simulation. A loss response of the simulated environment 608 is computed for each of the plurality of time steps (e.g., backwards in time) in response to the adjoint source. The loss response collectively refers to loss values of the plurality of voxels 612 that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range such that the photonic device provides the desired performed while maintaining fabricability.

Figure 7A:
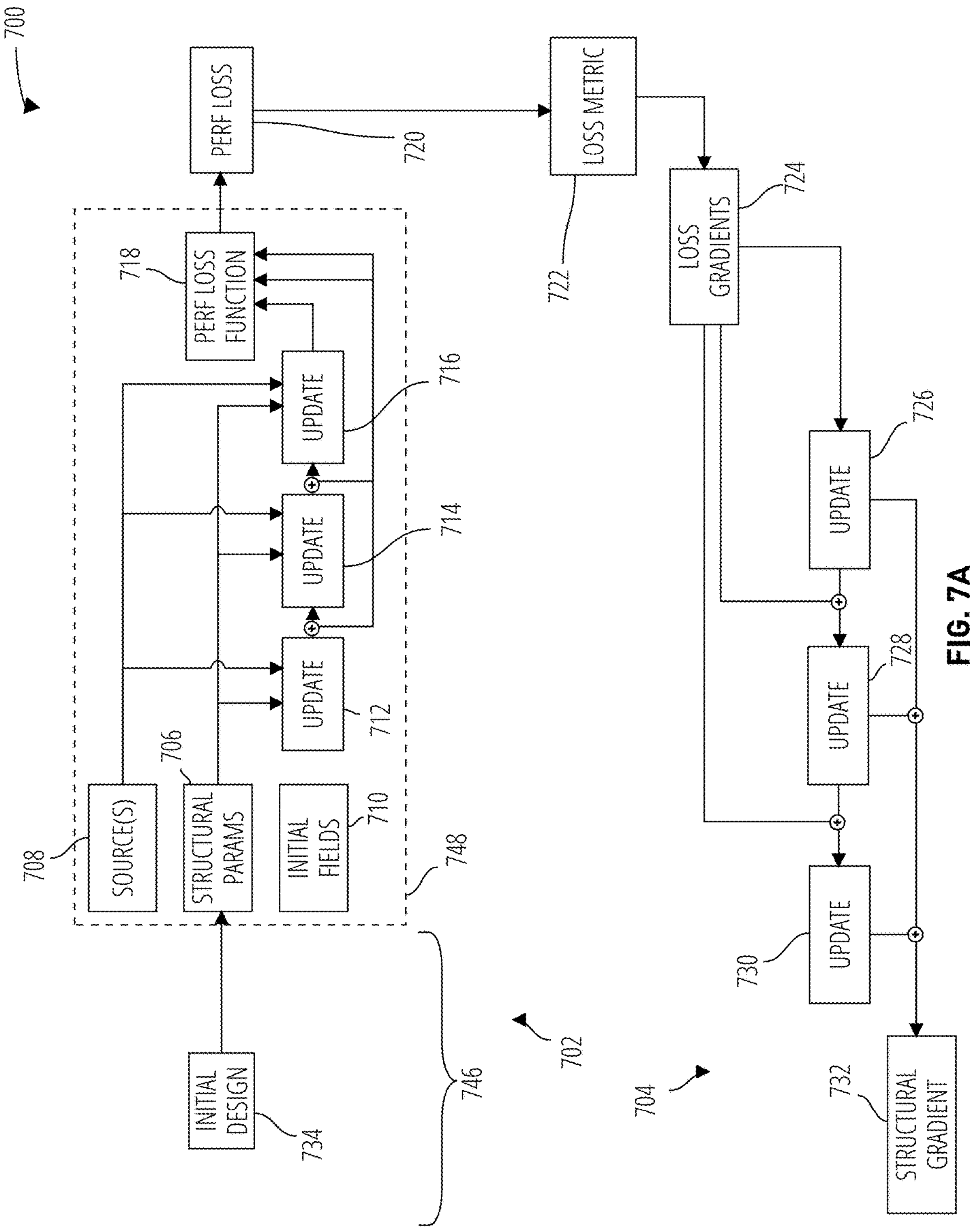
FIG. 7A is a flow chart illustrating example time steps for an operational simulation and an adjoint simulation, in accordance with various aspects of the present disclosure.

FIG. 7A is a flow chart 700 illustrating example time steps for an operational simulation 702 and an adjoint simulation 704, in accordance with various aspects of the present disclosure. Flow chart 700 is one possible implementation that a system may use to perform the operational simulation 702 and adjoint simulation 704 of the simulated environment describing a photonic integrated circuit (e.g., an optical device operating in an electromagnetic domain such a photonic demultiplexer). In the illustrated embodiment, the operational simulation 702 utilizes a finite-difference time-domain (FDTD) method, a finite-difference frequency-domain (FDFD) method, or any other suitable technique to model the field response (both electric and magnetic) or loss response at each of a plurality of voxels for a plurality of time steps in response to physical stimuli corresponding to an excitation source and/or adjoint source.

As illustrated in FIG. 7A, the operational simulation 702 includes a configuration portion 746 and a simulation portion 748. In the configuration portion 746, an initial design 734 is generated that is based on a design specification. In some embodiments, the design specification sets out one or more goals of the inverse design process, such as by providing expected performance characteristics and/or input locations for one or more input ports, expected performance characteristics and/or output locations for one or more output ports, a size of a design region, a size of a dispersive region, and/or fabrication constraints (including but not limited to one or more of a minimum feature size, a minimum distance between features, or a boundary buffer).

In some embodiments, the initial design 734 includes a parameterization of one or more characteristics of the design. The parameters representing the design are optimized by the remainder of the operational simulation 702 and the adjoint simulation 704 in order to generate a design for the physical device that is highly performant. One non-limiting example parameterization is the voxel-based parameterization illustrated in FIG. 6A-FIG. 6C and described above. Another non-limiting example parameterization includes parameters for the end position of the input waveguide, the start position of the output waveguide, and/or the size of the dispersive region. Other techniques for parameterization of the design are described below.

It is appreciated that the initial design 734 may be a relative term. Thus, in some embodiments an initial design 734 may be a first description of the physical device described within the context of the simulated environment (e.g., a first input design for performing a first operational simulation). However, in other embodiments, the term initial design 734 may refer to an initial design 734 of a particular cycle (e.g., of performing an operational simulation 702, operating an adjoint simulation 704, and updating the structural parameters). In such an embodiment, the initial design 734 or design of that particular cycle may correspond to a revised description or refined design (e.g., generated from a previous cycle). In some embodiments, the simulated environment includes a design region that includes a portion of the plurality of voxels which have structural parameters that may be updated, revised, or otherwise changed to optimize the structural parameters of the physical device. In the same or other embodiments, the structural parameters are associated with geometric boundaries and/or material compositions of the physical device based on the material properties (e.g., relative permittivity, index of refraction, etc.) of the simulated environment.

After the initial design 734 is generated, the operational simulation 702 proceeds to a simulation portion 748. To simulate the performance of the physical device, a set of structural parameters 706 are generated based on the initial design 734. The structural parameters 706 represent the physical structure of the physical device to be simulated, and may be represented by voxels 612 (or another format suitable for processing by the simulated environment) regardless of the specific parameterization provided by the initial design 734.

The simulation portion 748 occurs over a plurality of time-steps (e.g., from an initial time step to a final time step over a pre-determined or conditional number of time steps having a specified time step size) and models changes (e.g., from the initial field values 710) in electric and magnetic fields of a plurality of voxels describing the simulated environment and/or photonic device that collectively correspond to the field response. More specifically, update operations (e.g., update operation 712, update operation 714, and update operation 716) are iterative and based on the field response, structural parameters 706, and one or more excitation sources 708. Each update operation is succeeded by another update operation, which are representative of successive steps forward in time within the plurality of time steps. For example, update operation 714 updates the field values 738 (see, e.g., FIG. 7B) based on the field response determined from the previous update operation 712, excitation sources 708, and the structural parameters 706. Similarly, update operation 716 updates the field values 740 (see, e.g., FIG. 7B) based on the field response determined from update operation 714. In other words, at each time step of the operational simulation the field values (and thus field response) are updated based on the previous field response and structural parameters of the photonic device.

Once the final time step of the simulation portion 748 is performed, a performance loss function 718 is used to determine a performance loss value 720 associated with the initial design 734 that can be used to determine (or used as) a loss metric 722. In some embodiments, additional loss values, including but not limited to a fabrication loss value that is based on whether portions of the structural parameters 706 (and/or the initial design 734) are detected as violating one or more fabricability constraints, may be combined with the one or more performance loss values 720.

From the loss metric 722, loss gradients may be determined at block 724. The loss gradients determined from block 724 may be treated as adjoint or virtual sources (e.g., physical stimuli or excitation source originating at an output region or port) which are backpropagated in reverse (from the final time step incrementally through the plurality of time steps until reaching the initial time step via update operation 726, update operation 730, and update operation 728) to determine structural gradient 732.

In the illustrated embodiment, the FDTD (or other simulation technique) solve (e.g., simulation portion 748 of the operational simulation 702) and backward solve (e.g., adjoint simulation 704) problem are described pictorially, from a high-level, using "update" and "loss" operations as well as their corresponding gradient operations. The simulation is set up initially in which the structural parameters, physical stimuli (i.e., excitation source), and initial field states of the simulated environment (and photonic device) are provided (e.g., via an initial description and/or input design). As discussed previously, the field values are updated in response to the excitation source based on the structural parameters. More specifically, the update operation is given by $\phi$, where $x_{i+1}=\phi(x_i, \mathcal{b}_{i}, z)$ for $i=1, \ldots, n$. Here, n corresponds to the total number of time steps (e.g., the plurality of time steps) for the operational simulation, where $x_i$ corresponds to the field response (the field value associated with the electric and magnetic fields of each of the plurality of voxels) of the simulated environment at time step $i$, $\mathcal{b}_i$ corresponds to the excitation source(s) (the source value associated with the electric and magnetic fields for each of the plurality of voxels) of the simulated environment at time step i, and z corresponds to the structural parameters describing the topology and/or material properties of the physical device (e.g., relative permittivity, index of refraction, and the like).

It is noted that using the FDTD method, the update operation may specifically be stated as:

$$\phi(x_i, \mathcal{b}_i, z) = A(z)x_i + B(z)\mathcal{b}_i$$

That is to say the FDTD update is linear with respect to the field and source terms. Concretely, $A(z) \in \mathbb{R}^{N \times N}$ and $B(z) \in \mathbb{R}^{N \times N}$ are linear opreators which depend on the structure parameters, z, and act on the fields, $x_i$, and the sources, $\mathcal{b}_i$, respectively. Here, it is assumed that $x_i$, $\mathcal{b}_i \in \mathbb{R}^N$ where N is the number FDTD field components in the operational simulation. Additionally, the loss operation (e.g., loss function) may be given by $L=f(x_i, \ldots, x_n)$, which takes as input the computed fields and produces a single, real-valued scalar (e.g., the loss metric) that can be reduced and/or minimized.

In terms of revising or otherwise optimizing the structural parameters of the physical device, the relevant quantity to produce is $$\frac{dL}{dz},$$

which is used to describe the influence of changes in the structural parameters of the initial design 734 on the loss value and is denoted as the structural gradient 732 illustrated in FIG. 7A.

Figure 7B:
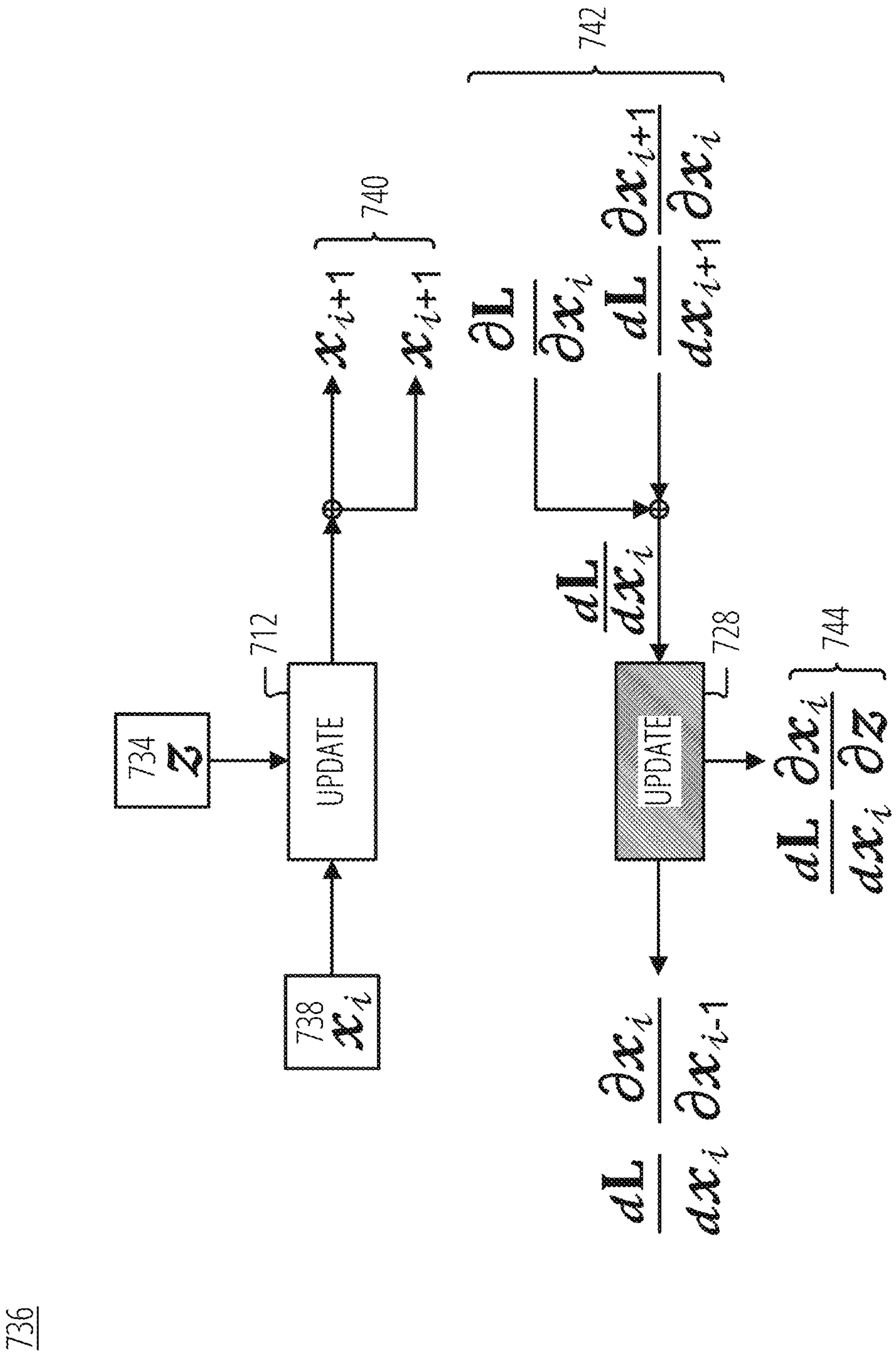
FIG. 7B is a chart illustrating the relationship between the update operation for the operational simulation and the adjoint simulation (e.g., backpropagation), in accordance with an embodiment of the present disclosure.

FIG. 7B is a chart 736 illustrating the relationship between the update operation for the operational simulation and the adjoint simulation (e.g., backpropagation), in accordance with an embodiment of the present disclosure. More specifically, FIG. 7B summarizes the operational and adjoint simulation relationships that are involved in computing the structural gradient, $$\frac{dL}{dz},$$

which include $$\frac{\partial L}{\partial x_i},$$

$$\frac{\partial x_{i+1}}{\partial x_i}$$

The update operation 714 of the operational simulation 702 updates the field values 738, $x_i$, of the plurality of voxels at the ith time step to the next time step (i.e., i+1 time step), which correspond to the field values 740, $x_{i+1}$. The gradients 742 are utilized to determine $$\frac{\partial L}{\partial x_i}$$

for the backpropagation (e.g., update operation 730 backwards in time), which combined with the gradients 744 are used, at least in part, to calculate the structural gradient, $$\frac{dL}{dz}.\frac{\partial L}{\partial x_i}$$

is the contribution of each field to the loss metric, L. It is noted that this is the partial derivative, and therefore does not take into account the causal relationship of $x_i \rightarrow x_{i+1}$. Thus, $$\frac{\partial x_{i+1}}{\partial x_i}$$

is utilized which encompasses the $x_i \rightarrow x_{i+1}$ relationship. The loss gradient, $$\frac{dL}{dx_i},$$

may also be used to compute the structural gradient, $$\frac{dL}{dz},$$

and corresponds to the total derivative of the field with respect to loss value, L. The loss gradient, $$\frac{dL}{dx_i},$$

at a particular time step, i, is equal to the summation of $$\frac{\partial L}{\partial x_i} + \frac{dL}{dx_{i+1}}\frac{\partial x_{i+1}}{\partial x_i}.$$

Finally, $$\frac{\partial x_i}{\partial z},$$

which corresponds to the field gradient, is used which is the contribution to $$\frac{dL}{dz}$$

from each time/update step.

In particular, the memory footprint to directly compute $$\frac{\partial L}{\partial x_i}$$

and $$\frac{dL}{dz}$$

is so large that it is difficult to store more than a handful of state Tensors. The state Tensor corresponds to storing the values of all of the FDTD cells (e.g., the plurality of voxels) for a single simulation time step. It is appreciated that the term "tensor" may refer to tensors in a mathematical sense or as described by the TensorFlow framework developed by Alphabet, Inc. In some embodiments the term "tensor" refers to a mathematical tensor which corresponds to a multidimensional array that follows specific transformation laws. However, in most embodiments, the term "tensor" refers to TensorFlow tensors, in which a tensor is described as a generalization of vectors and matrices to potentially higher dimensions (e.g., n-dimensional arrays of base data types), and is not necessarily limited to specific transformation laws. For example, for the general loss function $f$, it may be necessary to store the fields, $x_i$, for all time steps, i. This is because, for most choices of $f$, the gradient will be a function of the arguments of $f$. This difficulty is compounded by the fact that the values of $$\frac{\partial L}{\partial x_i}$$

for larger values of i are needed before the values for smaller i due to the incremental updates of the field response and/or through backpropagation of the loss metric, which may prevent the use of schemes that attempt to store only the values $$\frac{\partial L}{\partial x_i},$$

at an immediate time step.

An additional difficulty is further illustrated when computing the structural gradient, $$\frac{dL}{dz},$$

which is given by:

$$\frac{dL}{dz} = \sum_i \frac{dL}{dx_i}\frac{\partial x_i}{\partial z}.$$

For completeness, the full form of the first term in the sum, $$\frac{dL}{dz},$$

is expressed as:

$$\frac{dL}{dx_i} = \frac{\partial L}{\partial x_i} + \frac{dL}{dx_{i+1}}\frac{\partial x_{i+1}}{\partial x_i}$$

Based on the definition of $\phi$ as described by equation (1), it is noted that $$\frac{\partial x_{i+1}}{\partial x_i} = A(z),$$

which can be substituted in equation (3) to arrive at an adjoint update for backpropagation (e.g., the update operations such as update operation 730), which can be expressed as:

$$\frac{dL}{dx_i} = \frac{\partial L}{\partial x_i} + \frac{dL}{dx_{i+1}}A(z),$$

$$\text{or } \nabla_{x_i} L = A(z)^T \nabla_{x_{i+1}} L + \frac{\partial L^T}{\partial x_i}$$

The adjoint update is the backpropagation of the loss gradient (e.g., from the loss metric) from later to earlier time steps and may be referred to as a backwards solve for $$\frac{dL}{dx_i}.$$

More specifically, the loss gradient may initially be based upon the backpropagation of a loss metric determined from the operational simulation with the loss function. The second term in the sum of the structural gradient, $$\frac{dL}{dz},$$

corresponds to the field gradient and is denoted as:

$$\frac{\partial x_i}{\partial z} = \frac{d\phi(x_{i-1}, b_{i-1}, z)}{dz} = \frac{dA(z)}{dz}x_{i-1} + \frac{dB(z)}{dz}b_{i-1},$$

for the particular form of $\phi$ described by the first equation above. Thus, each term of the sum associated $$\frac{dL}{dz}$$

depends on both $$\frac{dL}{dx_{i_0}}$$

for $i>=i_0$ and $x_{i_0}$ for $i<i_0$. Since the dependency chains of these two terms are in opposite directions, it is concluded that computing $$\frac{dL}{dz}$$

in this way requires the storage of $x_i$ values for all of i. In some embodiments, the need to store all field values may be mitigated by a reduced representation of the fields.

In previous techniques, the optimization illustrated in FIG. 7A and FIG. 7B was used to update a design within the dispersive region 332 (i.e., the design region 614 of FIG. 6A-FIG. 6C) of the physical device. Limiting the optimization to the dispersive region 332 was desirable when only using a voxel-based representation of the dispersive region 332, given the computational complexity of expanding the optimization to larger areas. However, by using more flexible representations and more efficient parameterizations, embodiments of the present disclosure allow for optimization of features both inside and outside the dispersive region 332 in order to further optimize performance and manufacturability of the physical device.

In some embodiments of the present disclosure, in addition to using a suitable parameterization of a functional design within the dispersive region 332, additional optimizable parameters are provided for features within the periphery region 318, including at least one of one or more input waveguides, one or more output waveguides, and the design region. By using novel techniques for combining designs for the periphery region 318 with the designs for the structures inside the dispersive region 332, both can be efficiently optimized. In some embodiments, such techniques may also be used to combine multiple dispersive regions 332 into a design for a single physical device, thus allowing a design for an entire multi-component optoelectronic device to be optimized at once.

Figure 8A:
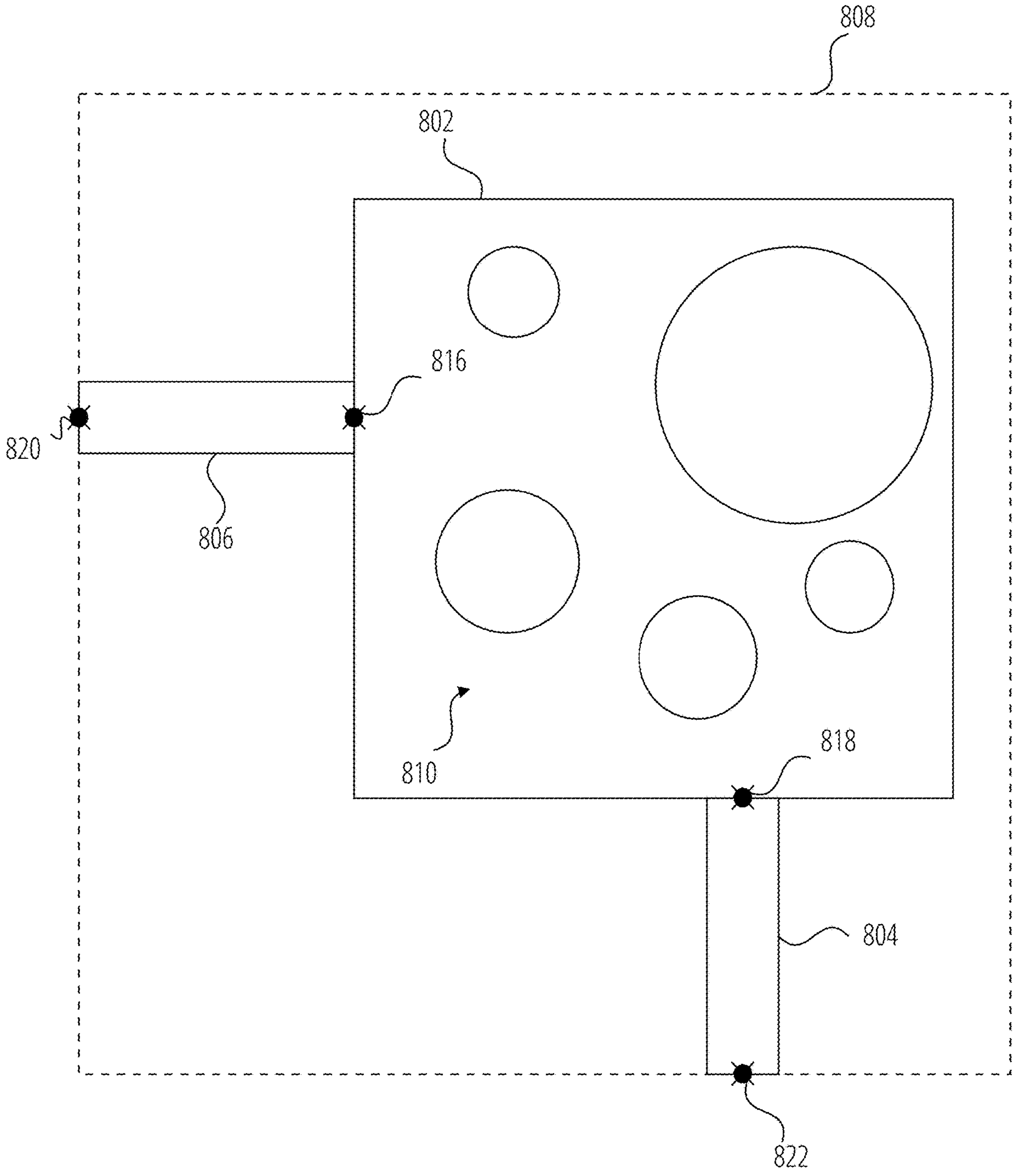
FIG. 8A-FIG. 8C are schematic illustrations of non-limiting example embodiments of parameterizations of an initial design wherein the design region includes features within the periphery region, according to various aspects of the present disclosure.
Figure 8B:
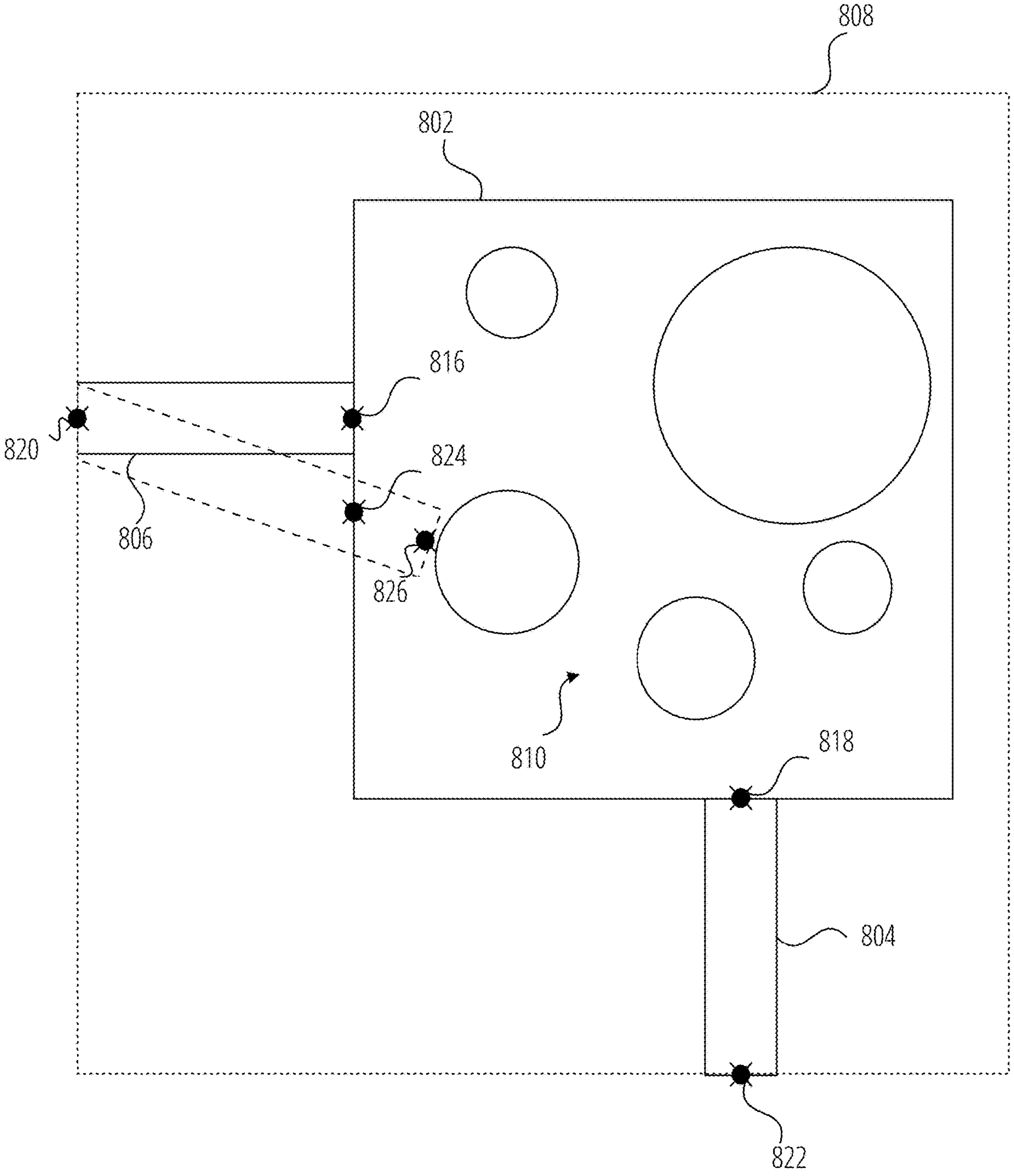
Figure 8C:
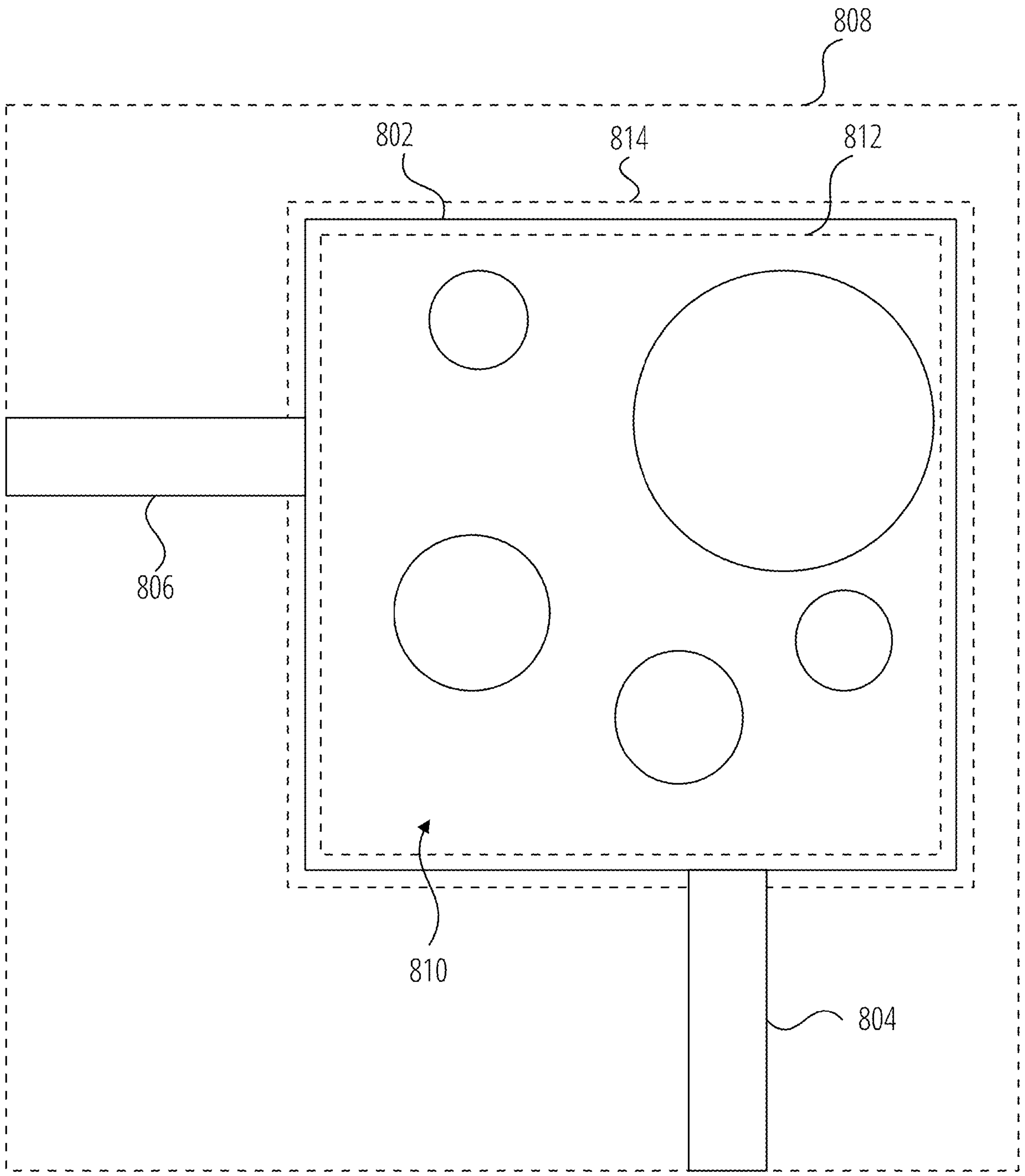

FIG. 8A-FIG. 8C are schematic illustrations of non-limiting example embodiments of parameterizations of an initial design wherein the design region includes features within the periphery region, according to various aspects of the present disclosure. FIG. 8A-FIG. 8C illustrate a waveguide bend physical device, wherein an input signal provided from the left side of the physical device is bent to be output from the bottom of the physical device. This type of physical device, which has a single input port and a single output port, is illustrated for the sake of clarity, but should not be seen as limiting. In other embodiments, other types of physical devices with different numbers of input ports and/or output ports may be designed. For example, in some embodiments, a demultiplexer having a single input port and a plurality of output ports may be designed. As another example, in some embodiments, a multiplexer having a plurality of input ports and a single output port may be designed.

In FIG. 8A, the design region 808 has been expanded from those illustrated in FIG. 6A-FIG. 6C to include both the dispersive region 802 and the surrounding periphery region. Within the design region 808, an input waveguide 806, an output waveguide 804, and the dispersive region 802 are defined. The input waveguide 806 extends from an input location 820 to an end position 816, and the output waveguide 804 extends from a start position 818 to an output location 822.

In some embodiments, a design specification may indicate a size of the design region 808, and may indicate fixed coordinates for the input location 820 and the output location 822. By providing fixed coordinates for the input location 820 and the output location 822, the resulting physical device can be integrated with other physical devices that expect the input location 820 and the output location 822 to be present at the specified locations. Meanwhile, the end position 816 and/or the start position 818 may be adjustable during the optimization process, as discussed further below. By providing a single parameter to be optimized for each of the waveguides, the computational complexity of the optimization of the waveguides can be reduced. In some embodiments, a size and/or location of the dispersive region 802 may also be adjustable during the optimization process.

In some embodiments, the input waveguide 806 and output waveguide 804 may be rectangular, and a width of each of the input waveguide 806 and the output waveguide 804 may be predetermined or indicated in a design specification in order to simplify the optimization and simulation of the design region 808. In some embodiments, widths and/or shapes of the input waveguide 806 and/or output waveguide 804 may be adjustable during the optimization.

Within the dispersive region 802, a functional design 810 is present. The functional design 810 is optimized by the optimization process to cause the design to accomplish a goal identified in the design specification. The functional design 810 may be parameterized in any suitable format. In some embodiments, the functional design 810 may be parameterized by voxels, as illustrated in FIG. 6A-FIG. 6C. In some embodiments, the functional design 810 may be parameterized by geometric shape primitives, as illustrated in FIG. 8A-FIG. 8C.

FIG. 8B illustrates how adjustment of the parameterization of the input waveguide 806 may alter the design. As shown, the end position 816 has been adjusted to an updated end position 824. As such, after the update the input waveguide 806 extends from the input location 820 to the updated end position 824, as indicated in dashed lines. An update to just the input waveguide 806 is illustrated in FIG. 8B for the sake of clarity. In some embodiments, the output waveguide 804 may be updated instead of or in addition to the input waveguide 806.

As shown, the end position 816 and the updated end position 824 are specified on a border of the dispersive region 802. In some embodiments, the end position 816 may be specified within the dispersive region 802 in order to allow the dispersive region 802 to grow or shrink without becoming disconnected from the input waveguide 806. Such an embodiment of the end position is illustrated as updated end position 826, which also coincides with the dotted line illustration of the updated input waveguide.

FIG. 8C illustrates how adjustment of the parameterization of the dispersive region 802 may alter the design. Two options for updates to the dispersive region 802 at a given optimization step are shown: an updated dispersive region 812 that is smaller than the dispersive region 802, and an updated dispersive region 814 that is larger than the dispersive region 802. While using only simple parameters that indicate a size of the dispersive region 802 (e.g., a single parameter that indicates both a height and width of a square dispersive region 802, or a pair of parameters that separately indicate a height and width of a rectangular dispersive region 802) as illustrated in FIG. 8C may maximally reduce the computational complexity of the optimization, in some embodiments, more and/or different parameters may be used. For example, in some embodiments, a location/center of the dispersive region 802 may also be adjusted during the optimization. As another example, in some embodiments, a different shape may be used for the dispersive region 802, including but not limited to a circle or a more complex polygon.

Figure 9A:
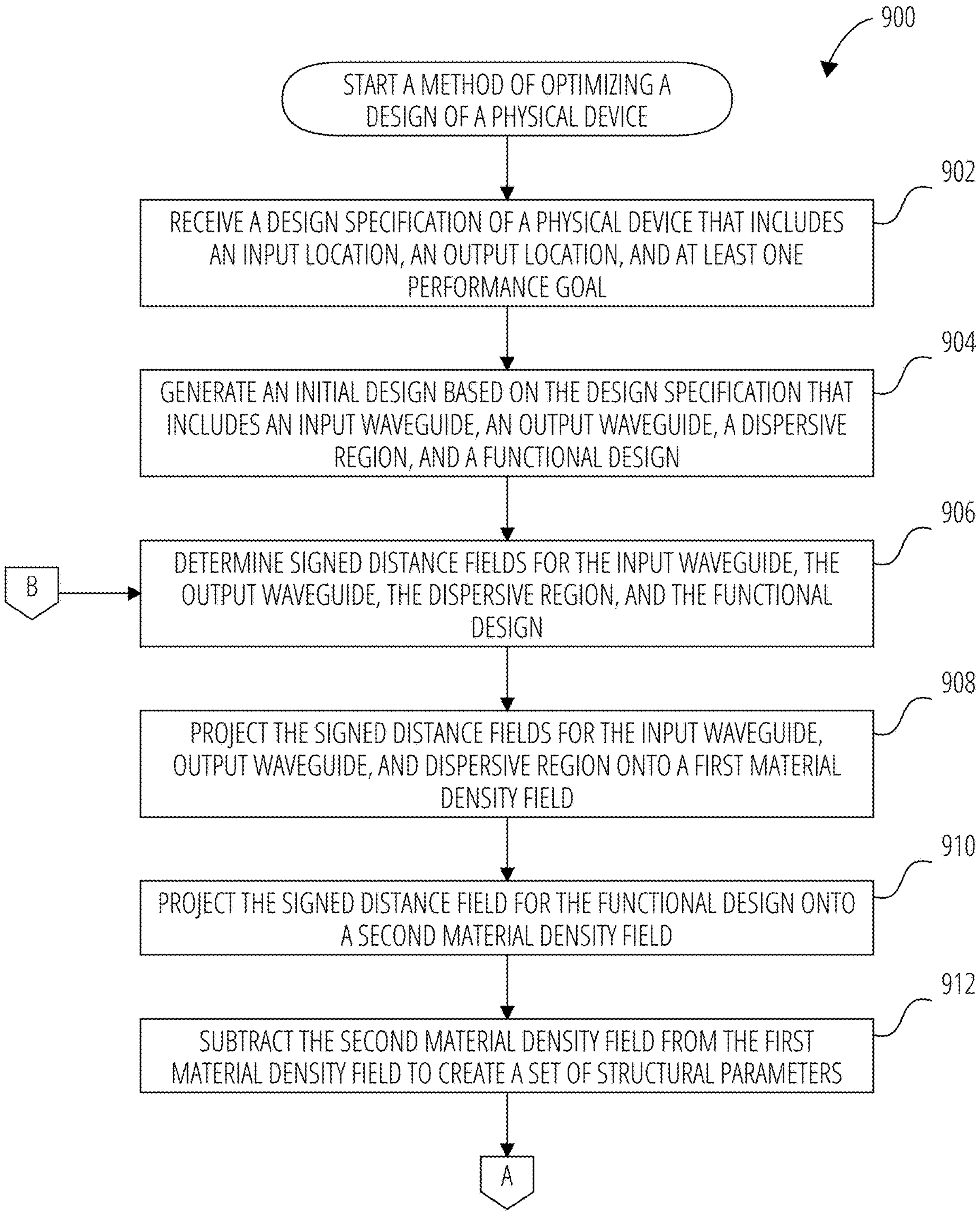
FIG. 9A-FIG. 9B are a flowchart that illustrates a non-limiting example embodiment of a method for optimizing a design of physical device such as a photonic integrated circuit in accordance with various aspects of the present disclosure.
Figure 9B:
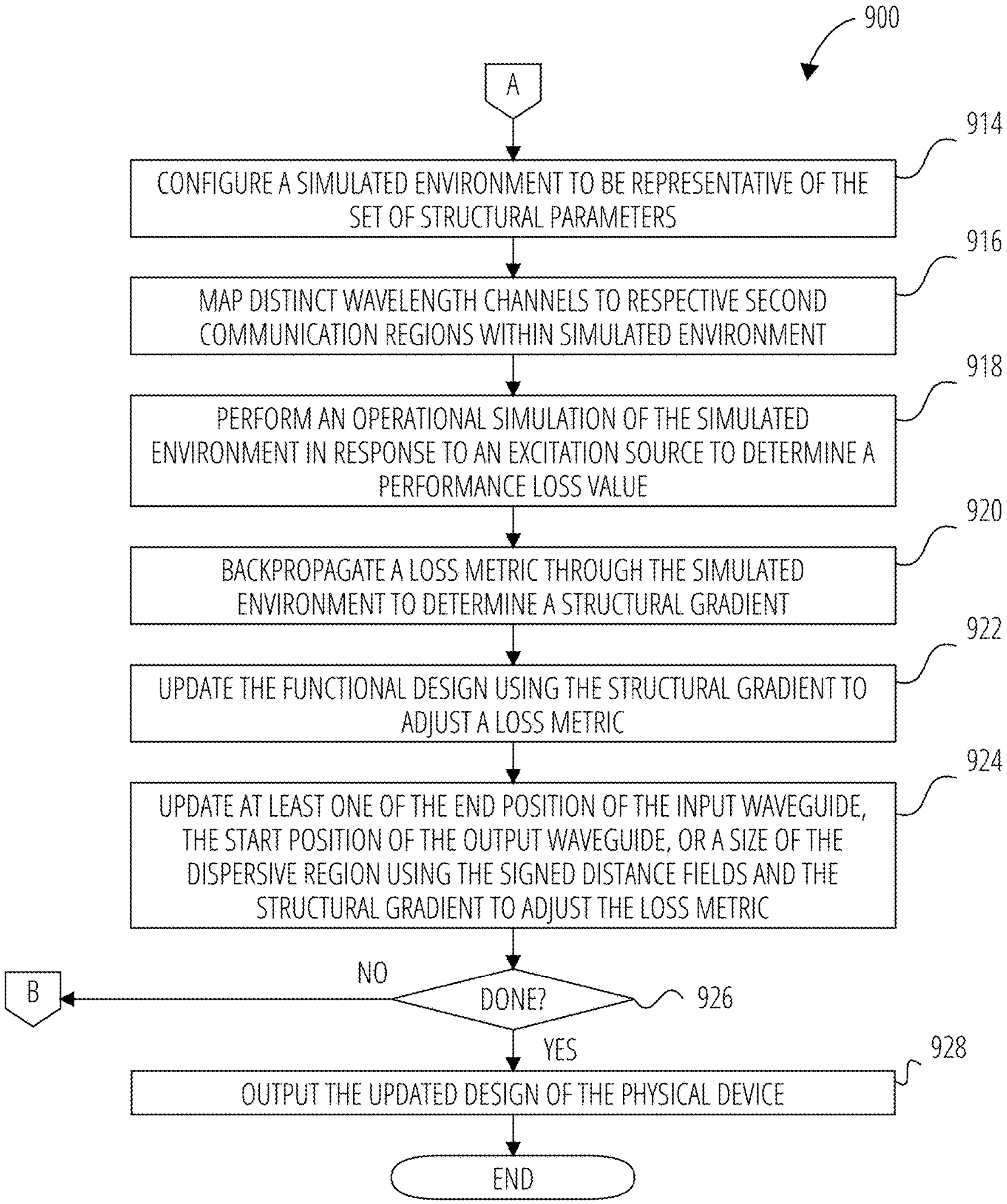

FIG. 9A-FIG. 9B are a flowchart that illustrates a non-limiting example embodiment of a method 900 for optimizing a design of physical device such as a photonic integrated circuit in accordance with various aspects of the present disclosure. It is appreciated that method 900 is an inverse design process that may be accomplished by performing operations with a system to perform iterative gradient-based optimization of a loss metric determined from a loss function that includes at least a performance loss, similar to that illustrated and described in FIG. 7A and FIG. 7B. In the same or other embodiments, method 900 may be included as instructions provided by at least one machine-accessible storage medium (e.g., non-transitory memory) that, when executed by a machine, will cause the machine to perform operations for generating and/or improving the design of the physical device. It is further appreciated that the order in which some or all of the process blocks appear in method 900 should not be deemed limiting. Rather, one of ordinary skill in the art having the benefit of the present disclosure will understand that some of the process blocks may be executed in a variety of orders not illustrated, and/or in parallel.

From a start block, the method 900 proceeds to block 902, where a design specification that includes an input location, an output location, and at least one performance goal for a physical device such as a photonic integrated circuit is received. In some embodiments, the physical device may be expected to have a certain functionality (e.g., perform as an optical demultiplexer, an optical multiplexer, an optical waveguide bend, or another type of optoelectronic component) after optimization, which is specified by the performance goal. In some embodiments, the performance goal may be specified by a desired set of scattering parameters ("S-parameters") for the physical device that indicate expected outputs at each port in response to given signals being supplied to each input port.

In some embodiments, the design specification may indicate an overall structure of the physical device (e.g., dimensions of a design region), desired performance of the device (e.g., desired performance characteristics at each input port and/or output port), one or more fabricability constraints (e.g., a minimum feature size, a minimum distance, a boundary buffer size, etc.) associated with a fabrication system to be used to fabricate the physical device, static characteristics of the design (e.g., widths and/or shapes of input waveguides and/or output waveguides, a center location of a dispersive region, etc.), and/or any other relevant specification.

At block 904, an initial design 734 is generated that includes an input waveguide 806, an output waveguide 804, a dispersive region 802, and a functional design 810. In some embodiments, the end position 816 for the input waveguide 806 may be positioned within the initial design 734 such that the input waveguide 806 extends perpendicularly from an edge of the design region 808 at the input location 820 to the end position 816. Likewise, in some embodiments, the start position 818 for the output waveguide 804 may be positioned within the initial design 734 such that the output waveguide 804 extends perpendicularly from an edge of the design region 808 at the output location 822 to the start position 818. The dispersive region 802 may be positioned within the initial design 734 at a default location (e.g., at a center of the design region 808 or at another suitable default location), and may have a default or random size.

In some embodiments, the structures of the functional design 810 may be randomly sized and randomly positioned within the dispersive region 802 of the initial design 734. In some embodiments, the initial structures of the functional design 810 may be of a default size and/or positioned at default or regular positions within the dispersive region 802 of the initial design 734. In some embodiments, the structures of the functional design 810 of the initial design 734 may be arranged to comply with the fabricability constraints associated with the fabrication system. In some embodiments, the structures of the functional design 810 may be arranged regardless of the fabricability constraints, with fabricability to be achieved during the optimization process.

While using a minimal number of values to parameterize the input waveguide, the output waveguide, and the dispersive region helps to reduce the computational complexity, one problem arises in that the parameters may be poorly differentiable, and it may be computationally complex to combine the designs for the structures within the periphery region with the functional design. Accordingly, it is desirable to use an intermediate, continuous representation for the structures in the periphery region and the structures in the functional design in order to combine them to create structural parameters to be simulated in order to improve differentiability of the overall design. Accordingly, at block 906, signed distance fields are determined for the input waveguide 806, the output waveguide 804, the dispersive region 802, and the functional design 810.

Figure 10:
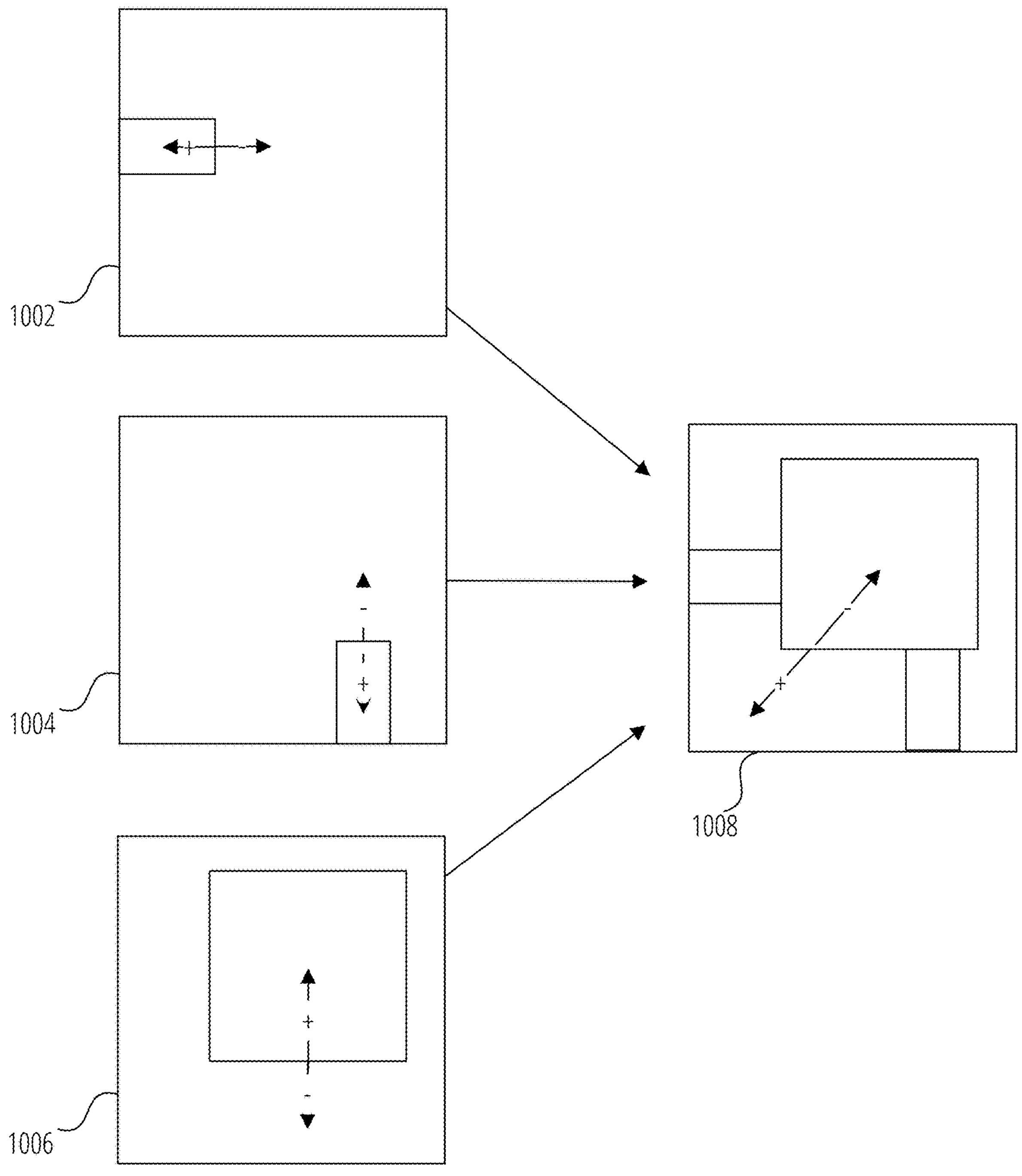
FIG. 10 includes schematic illustrations of non-limiting example embodiments of signed distance fields according to various aspects of the present disclosure.

FIG. 10 includes schematic illustrations of non-limiting example embodiments of signed distance fields according to various aspects of the present disclosure. The first signed distance field 1002, second signed distance field 1004, and third signed distance field 1006 are associated with the input waveguide 806, output waveguide 804, and dispersive region 802, respectively, as illustrated in FIG. 8A-FIG. 8C. In the first signed distance field 1002, increasingly negative values are assigned to areas on the interior of the input waveguide 806, and increasingly positive values are assigned to areas on the exterior of the input waveguide 806, based on distances from a border of the input waveguide 806. Likewise, in the second signed distance field 1004, increasingly negative values are assigned to areas on the interior of the output waveguide 804 and increasingly positive values are assigned to areas on the exterior of the output waveguide 804. Finally, in the third signed distance field 1006, increasingly negative values are assigned to areas on the interior of the dispersive region 802, and increasingly positive values are assigned to areas on the exterior of the dispersive region 802.

In some embodiments, real number values are used for the signed distance fields. As shown in FIG. 10, a separate signed distance field is created for each of the structures in the periphery region in the initial design 734. Though only three signed distance fields are illustrated in FIG. 10, one will recognize that a signed distance field will be created for each structure in the periphery region, in the event that there are greater than two waveguides and/or more than one dispersive region.

In some embodiments, the values for each signed distance field are determined analytically. For example, for each voxel x, y within the signed distance field, the value of the voxel is given by an analytic function that expresses a distance between the voxel x, y, and the edge of the associated structure. For example, for the first signed distance field 1002, the analytic function would express a distance between the voxel and the edge of the input waveguide 806. It should be noted that though the edges of the input waveguide 806, output waveguide 804, and dispersive region 802 are illustrated in FIG. 10 for the sake of clarity, the zero-value contours in the signed distance fields are implicit, and the actual outlines of these structures are not present in the signed distance fields.

Returning to FIG. 9A, at block 908, the signed distance fields for the input waveguide 806, the output waveguide 804, and the dispersive region 802 are projected onto a first material density field that represents presence or absence of a first material. As shown in FIG. 10, the signed distance fields are combined to create the first material density field 1008. In some embodiments, the first material density field may be of a size that matches the size of the design region 808 and may include voxels similar to the voxels 612 of the simulated environment 606 illustrated above. Values at corresponding positions of each signed distance field may be added to the corresponding voxels of the density field, such that all of the signed distance fields are combined into the single first material density field. After combination, a step of binarization may take place such that negative values may be set to a value of zero, and positive values may be set to a value of one, to indicate the presence or absence of a first material for the set of structural parameters 706. In some embodiments, some values within a threshold range of zero may be assigned a real value between zero and one to indicate a partial amount of the voxel to be filled with the first material. In some embodiments, instead of a hard threshold, the values of the first material density field may be passed through a sigmoid function to assign most values within the first material density field to zero or one, but to leave a differentiable transition region close to zero so that gradients can pass through the first material density field during optimization.

At block 910, the signed distance field for the functional design 810 is projected onto a second material density field that represents presence or absence of a second material. In some embodiments, the second material density field may also be of a size that matches the size of the design region 808. In some embodiments, the second material density field may be limited to the dispersive region 802 in which the functional design 810 is present. In some embodiments, individual structures in the functional design 810 may be represented by separate analytically determined signed distance fields, and each signed distance field may be projected separately onto the second material density field. One proposed example of creation of signed distance fields for a functional design 810 is described in commonly owned, co-pending U.S. application Ser. No. 18/066,948, filed Dec. 15, 2022, the entire disclosure of which is hereby incorporated by reference herein for all purposes.

At block 912, the second material density field is subtracted from the first material density field to create a set of structural parameters 706. As noted above, the structural parameters may include areas of a first material (e.g., silicon) and areas of a second material (e.g., silicon dioxide), where the second material is present in "holes" that are etched in the first material. As such, the second material density field (representing the "holes") is subtracted from the first material density field in order to create the set of structural parameters 706 to be simulated. By combining the density fields in this way, the structural gradient can be applied to both the functional design 810 and the design of the structures in the periphery region as described below.

The method 900 then proceeds to a continuation terminal ("terminal A"). From terminal A (FIG. 9B), the method 900 proceeds to block 914, where a simulated environment 606 is configured to be representative of the set of structural parameters 706. Within the simulated environment 606, each of the plurality of voxels is associated with a structural value to describe the structural parameters, a field value to describe the field response (e.g., the electric and magnetic fields in one or more orthogonal directions) to physical stimuli (e.g., one or more excitation sources), and a source value to describe the physical stimuli. Once the structural parameters 706 are determined, the simulated environment 606 is configured (e.g., the number of voxels, shape/arrangement of voxels, and specific values for the structural value, field value, and/or source value of the voxels are set based on the structural parameters 706).

In some embodiments the simulated environment includes a design region optically coupled between a first communication region and a plurality of second communication regions. In some embodiments, the first communication region may correspond to an input region or port (e.g., where an excitation source originates), while the second communication may correspond to a plurality of output regions or ports (e.g., when designing an optical demultiplexer that optically separates a plurality of distinct wavelength channels included in a multi-channel optical signal received at the input port and respectively guiding each of the distinct wavelength channels to a corresponding one of the plurality of output ports). However, in other embodiments, the first communication region may correspond to an output region or port, while the plurality of second communication regions corresponds to a plurality of input ports or region (e.g., when designing an optical multiplexer that optically combines a plurality of distinct wavelength signals received at respective ones of the plurality of input ports to form a multi-channel optical signal that is guided to the output port).

At block 916, each of a plurality of distinct wavelength channels are mapped to a respective one of the plurality of second communication regions. The distinct wavelength channels may be mapped to the second communication regions by virtue of the design specification. For example, a loss function may be chosen that associates a performance metric of the physical device with power transmission from the input port to individual output ports for mapped channels. In one embodiment, a first channel included in the plurality of distinct wavelength channels is mapped to a first output port, meaning that the performance metric of the physical device for the first channel is tied to the first output port. Similarly, other output ports may be mapped to the same or different channels included in the plurality of distinct wavelength channels such that each of the distinct wavelength channels is mapped to a respective one of the plurality of output ports (i.e., second communication regions) within the simulated environment 606. In one embodiment, the plurality of second communication regions includes four regions and the plurality of distinct wavelength channels includes four channels that are each mapped to a corresponding one of the four regions. In other embodiments, there may be a different number of the second communication regions (e.g., 8 regions) and a different number of channels (e.g., 8 channels) that are each mapped to a respective one of the second communication regions. In some embodiments, only a single input port and a single output port may be included, such as for waveguide bends or other devices intended to change a direction of an incoming signal to another direction.

Block 918 illustrates performing an operational simulation 702 of the physical device within the simulated environment 606 operating in response to one or more excitation sources to determine a performance loss value 720. More specifically, in some embodiments an electromagnetic simulation is performed in which a field response of the photonic integrated circuit is updated incrementally over a plurality of time steps to determine how the how the field response of the physical device changes due to the excitation source. The field values of the plurality of voxels are updated in response to the excitation source and based, at least in part, on the structural parameters 706 of the integrated photonic circuit. Additionally, each update operation at a particular time step may also be based, at least in part, on a previous (e.g., immediately prior) time step.

Consequently, the operational simulation 702 simulates an interaction between the photonic device (i.e., the photonic integrated circuit) and a physical stimuli (i.e., one or more excitation sources) to determine a simulated output of the photonic device (e.g., at one or more of the output ports or regions) in response to the physical stimuli. The interaction may correspond to any one of, or combination of a perturbation, retransmission, attenuation, dispersion, refraction, reflection, diffraction, absorption, scattering, amplification, or otherwise of the physical stimuli within electromagnetic domain due, at least in part, to the structural parameters 706 of the photonic device and underlying physics governing operation of the photonic device. Thus, the operational simulation 702 simulates how the field response of the simulated environment 606 changes due to the excitation source over a plurality of time steps (e.g., from an initial to final time step with a pre-determined step size).

In some embodiments, the simulated output may be utilized to determine one or more performance metrics of the physical device. For example, the excitation source may correspond to a selected one of a plurality of distinct wavelength channels that are each mapped to one of the plurality of output ports. The excitation source may originate at or be disposed proximate to the first communication region (i.e., input port) when performing the operational simulation 702. During the operational simulation 702, the field response at the output port mapped to the selected one of the plurality of distinct wavelength channels may then be utilized to determine a simulated power transmission of the photonic integrated circuit for the selected distinct wavelength channel. In other words, the operational simulation 702 may be utilized to determine the performance metric that includes determining a simulated power transmission of the excitation source from the first communication region, through the design region, and to a respective one of the plurality of second communication regions mapped to the selected one of the plurality of distinct wavelength channels. In some embodiments, the excitation source may cover the spectrum of all of the plurality of output ports (e.g., the excitation source spans at least the targeted frequency ranges for the bandpass regions for each of the plurality of distinct wavelength channels as well as the corresponding transition band regions, and at least portions of the corresponding stopband regions) to determine a performance metric (i.e., simulated power transmission) associated with each of the distinct wavelength channels for the photonic integrated circuit. In some embodiments, one or more frequencies that span the passband of a given one of the plurality of distinct wavelength channels is selected randomly to optimize the design (e.g., batch gradient descent while having a full width of each passband including ripple in the passband that meets the target specifications). In the same or other embodiments, each of the plurality of distinct wavelength channels has a common bandwidth with different center wavelengths. The performance metric may then be used to generate a performance loss value for the initial design 734. The performance loss value may correspond to a difference between the performance metric and a target performance metric of the physical device.

In some embodiments, the loss metric 722 may include terms in addition to the performance loss value in order to optimize different aspects of the initial design 734. For example, in some embodiments, a term for a fabrication loss value may be included in the loss metric 722.

Block 920 illustrates backpropagating the loss metric 722 via the loss function through the simulated environment 606 to determine an influence of changes in the structural parameters 706 on the loss metric (i.e., structural gradient). The loss metric is treated as an adjoint or virtual source and is backpropagated incrementally from a final time step to earlier time steps in a backwards simulation to determine the structural gradient of the physical device.

Block 922 shows updating the functional design 810 using the structural gradient to adjust a loss metric. Any suitable technique may be used to update the functional design 810 using the structural gradient, including the technique illustrated in FIG. 7B, or the technique described in U.S. patent application Ser. No. 18/066,948 incorporated by reference above. In some embodiments, the signed distance field for the functional design 810 may be used to apply the structural gradient to the functional design 810. In some embodiments, other techniques may be used to apply the structural gradient to the functional design 810.

Block 924 shows updating at least one of the end position 816 of the input waveguide 806, the start position 818 of the output waveguide 804, or a size of the dispersive region 802 using the signed distance fields and the structural gradient to adjust the loss metric. The backpropagation is first applied to the structural parameters, from the structural parameters to the density field, from the density field to the signed distance fields, and from the signed distance fields to the parameters of the structures within the periphery region.

By using differentiable functions to convert from the structures within the periphery region to signed distance fields, the gradients can flow all the way back to the structures within the periphery region. In other words, the optimizer obtains $$\frac{dL}{d\ \text{periphery}}$$

via:

$$\frac{dL}{d\ \text{periphery}} = \frac{dL}{dSDF} \cdot \frac{dSDF}{d\ \text{periphery}},$$

with $$\frac{dSDF}{d\ \text{periphery}}$$

being obtainable from the analytic functions defining the values for the signed distance field for each structure within the periphery region.

Though block 922 and block 924 are illustrated as separate steps, in some embodiments, the updates to the functional design 810 and the updates to the at least one of the end position 816 of the input waveguide 806, the start position 818 of the output waveguide 804, or a size of the dispersive region 802, may be co-optimized or otherwise optimized at the same time. In other words, the application of the gradients to update the initial design 734 may update a single concatenated vector V that includes the end position 816 of the input waveguide 806, the start position 818 of the output waveguide 804, the size of the dispersive region 802, and the parameters of the functional design 810 (which may be represented in any suitable way). In some embodiments, a technique such as the method of moving asymptotes (MMA) may be used to use the gradients to update the initial design 734.

In some embodiments, adjusting for the loss metric may reduce the loss metric. However, in other embodiments, the loss metric may be adjusted or otherwise compensated in a manner that does not necessarily reduce the loss metric. In some embodiments, the revised description is generated by utilizing an optimization scheme after a cycle of operational and adjoint simulations via a gradient descent algorithm, Markov Chain Monte Carlo algorithm, or other optimization techniques. Put in another way, iterative cycles of simulating the physical device, determining a loss metric, backpropagating the loss metric, updating the structural parameters to adjust the loss metric, and updating the initial design using the signed distance fields may be successively performed until the loss metric substantially converges such that the difference between the performance metric and the target performance metric is within a threshold range. In some embodiments, the term "converges" may simply indicate the difference is within the threshold range and/or below some threshold value.

At decision block 926, a determination is made regarding whether optimization of the design of the physical device is done. In some embodiments, optimization of the design of the physical device may be done when it is determined that the loss metric 722 has reached an acceptable value, such as a value specified by the design specification. In some embodiments, optimization of the design of the physical device may be done after a predetermined number of iterations.

If the determination is that optimization is not yet done, then the result of decision block 926 is NO, and the method 900 returns to block 906 to iterate on the updated initial design 734. Otherwise, if the determination is that optimization is done, then the result of decision block 926 is YES and the method 900 advances to block 928.

Block 928 illustrates outputting the updated design of the physical device. The updated design may be output to a computer-readable medium for storage and later operations, including but not limited to fabrication, further optimization, or inclusion in additional designs. In some embodiments, the updated design may be output to a fabrication system for fabrication of the physical device. In some embodiments, the updated design may be output to the fabrication system by providing a grid of voxels that each indicate a material to be included at a corresponding position of the physical device. In some embodiments, the updated design may be output to the fabrication system by outputting a list of geometric shape primitives, which may then be ingested by the fabrication system for fabricating the physical device.

The method 900 then proceeds to an end block and terminates.

Figure 11:
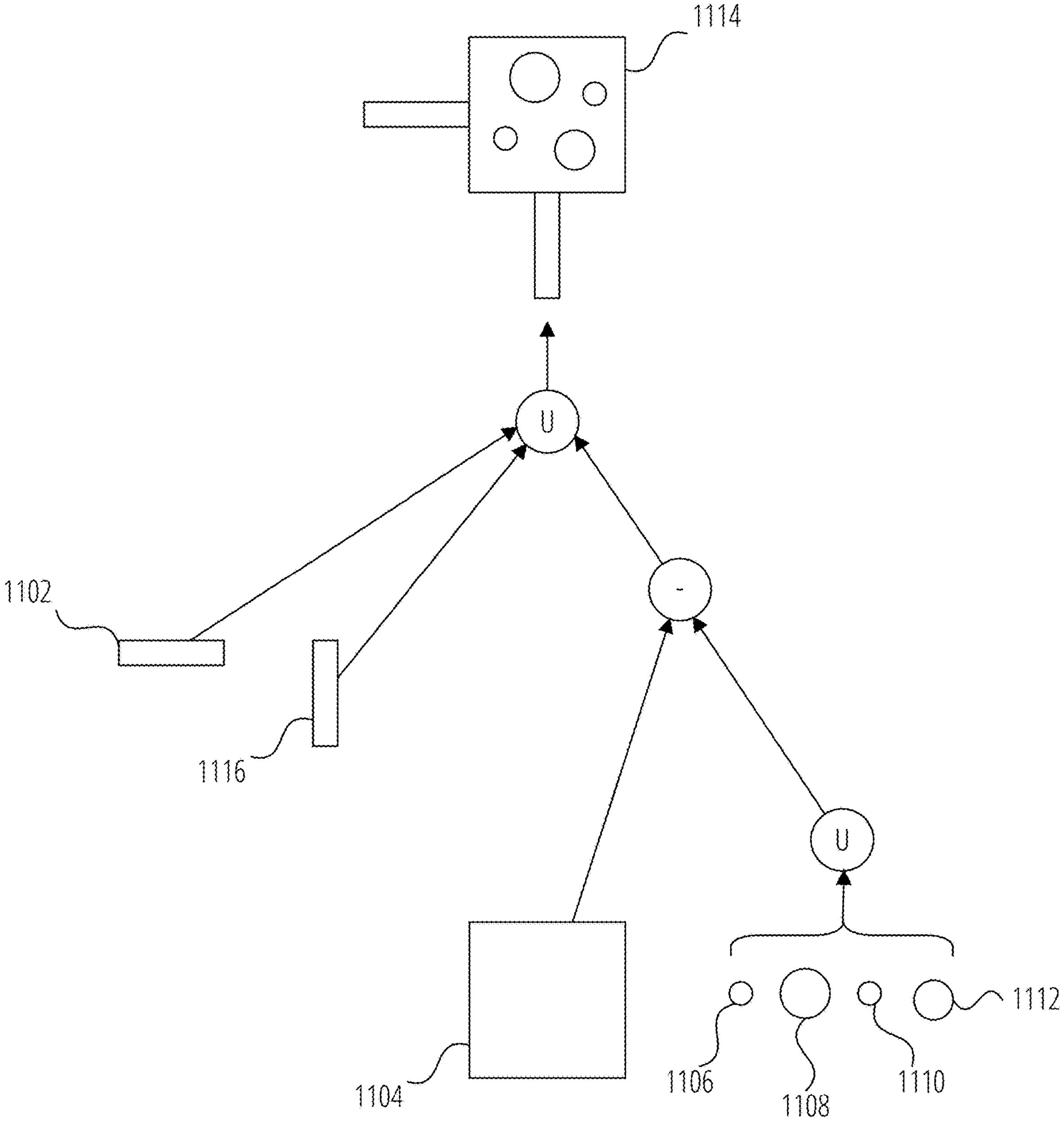
FIG. 11 is a schematic illustration of a high-level composition of a non-limiting example embodiment of physical device according to various aspects of the present disclosure.

FIG. 11 is a schematic illustration of a high-level composition of a non-limiting example embodiment of physical device according to various aspects of the present disclosure. As shown, a physical device such as a waveguide bend 1114 may be composed of a tree of different subcomponents which are then combined using union and subtraction operations, depending on whether the subcomponents represent a first material or a second material. For example, an input waveguide 1102, an output waveguide 1116, and a dispersive region 1104 may be components of a first material, and a first feature 1106, a second feature 1108, a third feature 1110, and a fourth feature 1112 may be of a second material. The first feature 1106, second feature 1108, third feature 1110, and fourth feature 1112 are combined together using a union operation to create a combined design of the second material. This combined design is then subtracted from the dispersive region 1104, which is of the first material, to create a further combined design of the first material. This further combined design of the first material is then combined with the input waveguide 1102 and the output waveguide 1116 (which are both also of the first material) using another union operation to create the waveguide bend 1114.

By using these union and subtraction operations, physical devices with arbitrary numbers of components specified in either a first material or a second material may be designed and optimized using embodiments of the present disclosure. Further, the description of union and subtraction operations should not be seen as limiting, and in some embodiments, other types of logical or set operations may be used to combine subcomponents to create combined designs for physical devices.

The techniques discussed above were primarily presented in the context of a design that includes a single input waveguide 806, a single output waveguide 804, and a single dispersive region 802 having a plurality of features. One will recognize that in other embodiments, designs may be generated and optimized that include more than one input waveguide 806, more than one output waveguide 804, and/or more than one dispersive region 802. In some embodiments, if a design has more than one dispersive region 802, the design may also have one or more internal waveguides connecting the dispersive regions. By including more than one dispersive region 802, more complex physical devices can be designed.

Figure 12:
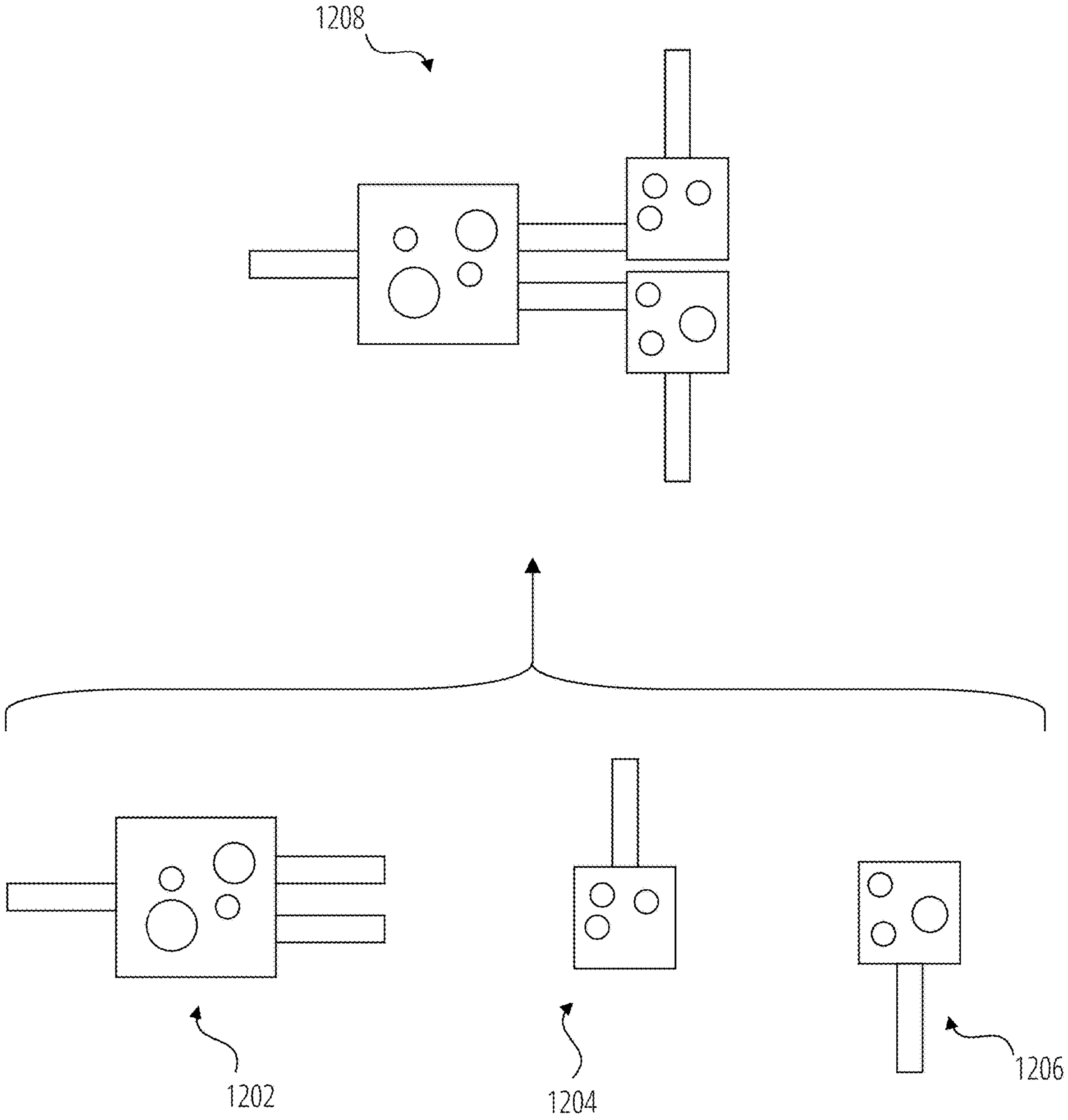
FIG. 12 is a schematic illustration of a non-limiting example embodiment of a design of a complex physical device that includes a plurality of dispersive regions according to various aspects of the present disclosure.

FIG. 12 is a schematic illustration of a non-limiting example embodiment of a design of a complex physical device that includes a plurality of dispersive regions according to various aspects of the present disclosure. As shown, a first design 1202 (a demultiplexer), a second design 1204 (a first waveguide bend), and a third design 1206 (a second waveguide bend) are combined to create a combined design 1208. In some embodiments, each of the first design 1202, second design 1204, and third design 1206 may be initialized and optimized separately, and may be combined after being optimized to create the combined design 1208. In some embodiments, the design specification may specify the input location for the first design 1202, the output location of the second design 1204, the output location for the third design 1206, and positions for the dispersive regions of each of the designs in a common design region, and all three of the designs may be optimized at the same time during the method 900. In such combined optimization techniques, the design specification may include performance goals for each individual design, or may merely include overall performance goals for the output ports and allow the optimization process to discover optimal performance goals for the individual designs. In some embodiments, the separate designs may be combined by adding and/or subtracting associated density fields as appropriate.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having computer-executable instructions stored thereon that, in response to execution by one or more processors of a computing system, cause the computing system to perform actions for designing a physical device, the actions comprising:

receiving, by the computing system, a design specification that includes an input location, an output location, and at least one performance goal;

generating, by the computing system, an initial design based on the design specification, wherein the initial design includes an input waveguide starting at the input location and extending to an end position, an output waveguide starting at a start position and extending to the output location, and a dispersive region;

determining, by the computing system, a set of structural parameters based on the initial design;

simulating, by the computing system, performance of the initial design using the set of structural parameters to determine a performance loss value based on the at least one performance goal; and updating, by the computing system, at least one of the end position of the input waveguide, the start position of the output waveguide, or a size of the dispersive region in the initial design using a gradient of the performance loss value;

wherein determining the set of structural parameters includes determining a signed distance field for the input waveguide, a signed distance field for the output waveguide, a signed distance field for the dispersive region, and a signed distance field for a functional design within the dispersive region.

2. The non-transitory computer-readable medium of claim 1, wherein determining the set of structural parameters includes:

projecting the signed distance field for the input waveguide, the signed distance field for the output waveguide, and the signed distance field for the dispersive region onto a first material density field;

projecting the signed distance field for the design within the dispersive region onto a second material density field; and subtracting the second material density field from the first material density field to create the set of structural parameters.

3. The non-transitory computer-readable medium of claim 1, wherein the actions further comprise updating the design within the dispersive region.

4. The non-transitory computer-readable medium of claim 3, wherein the design within the dispersive region is parameterized by a plurality of geometric shape primitives.

5. The non-transitory computer-readable medium of claim 1, wherein the design specification includes more than one input location and wherein the initial design includes more than one input waveguide; or wherein the design specification includes more than one output location and wherein the initial design includes more than one output waveguide.

6. The non-transitory computer-readable medium of claim 1, wherein the initial design includes more than one dispersive region.

7. The non-transitory computer-readable medium of claim 6, wherein the initial design includes one or more internal waveguides connecting the dispersive regions.

8. The non-transitory computer-readable medium of claim 6, wherein the more than one dispersive region includes at least one dispersive region configured to operate as a multiplexer or demultiplexer, and at least one dispersive region configured to operate as a waveguide bend.

9. The non-transitory computer-readable medium of claim 1, wherein the actions further comprise transmitting the updated initial design to a fabrication system for fabricating the physical device.

10. A computer-implemented method for designing a physical device, the actions comprising:

receiving, by a computing system, a design specification that includes an input location, an output location, and at least one performance goal;

generating, by the computing system, an initial design based on the design specification, wherein the initial design includes an input waveguide starting at the input location and extending to an end position, an output waveguide starting at a start position and extending to the output location, and a dispersive region;

determining, by the computing system, a set of structural parameters based on the initial design;

simulating, by the computing system, performance of the initial design using the set of structural parameters to determine a performance loss value based on the at least one performance goal; and updating, by the computing system, at least one of the end position of the input waveguide, the start position of the output waveguide, or a size of the dispersive region in the initial design using a gradient of the performance loss value;

wherein determining the set of structural parameters includes determining a signed distance field for the input waveguide, a signed distance field for the output waveguide, a signed distance field for the dispersive region, and a signed distance field for a functional design within the dispersive region.

11. The computer-implemented method of claim 10, wherein determining the set of structural parameters includes:

projecting the signed distance field for the input waveguide, the signed distance field for the output waveguide, and the signed distance field for the dispersive region onto a first material density field;

projecting the signed distance field for the design within the dispersive region onto a second material density field; and subtracting the second material density field from the first material density field to create the set of structural parameters.

12. The computer-implemented method of claim 10, further comprising updating the design within the dispersive region.

13. The computer-implemented method of claim 12, wherein the design within the dispersive region is parameterized by a plurality of geometric shape primitives.

14. The computer-implemented method of claim 10, wherein the design specification includes more than one input location and wherein the initial design includes more than one input waveguide; or wherein the design specification includes more than one output location and wherein the initial design includes more than one output waveguide.

15. The computer-implemented method of claim 10, wherein the initial design includes more than one dispersive region.

16. The computer-implemented method of claim 15, wherein the initial design includes one or more internal waveguides connecting the dispersive regions.

17. The computer-implemented method of claim 15, wherein the more than one dispersive region includes at least one dispersive region configured to operate as a multiplexer or demultiplexer, and at least one dispersive region configured to operate as a waveguide bend.

18. The computer-implemented method of claim 10, further comprising transmitting the updated initial design to a fabrication system for fabricating the physical device.

* * * * *